US011367968B2

(12) United States Patent
Lin

(10) Patent No.: US 11,367,968 B2
(45) Date of Patent: *Jun. 21, 2022

(54) WIRELESS SIGNAL TRANSCEIVER DEVICE WITH DUAL-POLARIZED ANTENNA WITH AT LEAST TWO FEED ZONES

(71) Applicant: RichWave Technology Corp., Taipei (TW)

(72) Inventor: Shih-Kai Lin, Taipei (TW)

(73) Assignee: RichWave Technology Corp., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/037,657

(22) Filed: Sep. 29, 2020

(65) Prior Publication Data

US 2021/0013634 A1 Jan. 14, 2021

Related U.S. Application Data

(63) Continuation-in-part of application No. 16/698,867, filed on Nov. 27, 2019, now Pat. No. 10,833,745, (Continued)

(30) Foreign Application Priority Data

Feb. 14, 2018 (TW) ................................ 107105524

(51) Int. Cl.
*H04B 1/38* (2015.01)
*H01Q 9/04* (2006.01)
(Continued)

(52) U.S. Cl.
CPC ............ *H01Q 25/001* (2013.01); *H01Q 5/35* (2015.01); *H01Q 21/245* (2013.01)

(58) Field of Classification Search
CPC ... H04B 1/48; H04B 1/40; H04B 1/44; H04B 1/54; H01Q 23/00; H01Q 9/045
See application file for complete search history.

(56) References Cited

U.S. PATENT DOCUMENTS 5,966,102 A 10/1999 Runyon
6,229,484 B1 5/2001 Sagisaka
(Continued)

FOREIGN PATENT DOCUMENTS

CN 1476654 A 2/2004
CN 1636299 A 7/2005
(Continued)

OTHER PUBLICATIONS

Notice of Allowance dated Feb. 18, 2022 for the Taiwan application No. 110130419, filing date Nov. 25, 2020, pp. 1-4.

*Primary Examiner* — Andrew Wendell
(74) *Attorney, Agent, or Firm* — Winston Hsu

(57) ABSTRACT

A wireless signal transceiver device includes a dual-polarized antenna, a transmission circuit, a reception circuit and a processor. The dual-polarized antenna includes a first feed zone and a second feed zone. The first feed zone is used to receive a transmission signal for the dual-polarized antenna to transmit a first wireless signal accordingly. The second feed zone is used to output a reception signal generated according to a second wireless signal. The dual-polarized antenna is used to form a first radiated electric-field having a first co-polarization according to the first wireless signal and form a second radiated electric-field having a second co-polarization according to the second wireless signal. The first co-polarization and the second co-polarization form an angle between 45 degrees to 135 degrees to each other in a far field.

20 Claims, 23 Drawing Sheets

Related U.S. Application Data which is a continuation-in-part of application No. 16/157,106, filed on Oct. 11, 2018, now Pat. No. 10,530,413.

(60) Provisional application No. 63/006,064, filed on Apr. 6, 2020, provisional application No. 62/607,922, filed on Dec. 20, 2017.

(51) Int. Cl.

| | |
|---|---|
| ***H01Q 25/00*** | (2006.01) |
| ***H01Q 5/35*** | (2015.01) |
| ***H01Q 21/24*** | (2006.01) |

(56) References Cited

U.S. PATENT DOCUMENTS

| | | | | |
|---|---|---|---|---|
| 8,664,955 | B1 | 3/2014 | Halpern | |
| 9,595,764 | B2 | 3/2017 | Loftus | |
| 10,530,413 | B2 | 1/2020 | Chen | |
| 10,833,745 | B2 * | 11/2020 | Chen | G01S 13/4409 |
| 2005/0099330 | A1 | 5/2005 | Hausner | |
| 2005/0206568 | A1 | 9/2005 | Phillips | |
| 2007/0146225 | A1 * | 6/2007 | Boss | H01Q 21/26 343/797 |
| 2010/0302123 | A1 | 12/2010 | Knudsen | |
| 2010/0321238 | A1 * | 12/2010 | Shen | H01Q 21/061 342/373 |
| 2013/0044035 | A1 | 2/2013 | Zhuang | |
| 2015/0194730 | A1 | 7/2015 | Sudo | |
| 2017/0134154 | A1 | 5/2017 | Pratt | |
| 2017/0222306 | A1 | 8/2017 | Biscontini | |
| 2017/0264014 | A1 | 9/2017 | Le-Ngoc | |
| 2018/0269576 | A1 | 9/2018 | Scarborough | |
| 2019/0190562 | A1 | 6/2019 | Chen | |
| 2020/0044362 | A1 * | 2/2020 | Song | H01Q 19/10 |

FOREIGN PATENT DOCUMENTS

| | | | |
|---|---|---|---|
| CN | 1898837 | A | 1/2007 |
| CN | 101647211 | A | 2/2010 |
| CN | 102043146 | A | 5/2011 |
| CN | 102570015 | A | 7/2012 |
| CN | 102598413 | A | 7/2012 |
| CN | 109951205 | A | 6/2019 |
| EP | 2688143 | A1 | 1/2014 |
| EP | 2 688 143 | B1 | 11/2017 |
| TW | 201236267 | A1 | 9/2012 |
| TW | I648911 | B | 1/2019 |

* cited by examiner

WIRELESS SIGNAL TRANSCEIVER DEVICE WITH DUAL-POLARIZED ANTENNA WITH AT LEAST TWO FEED ZONES

CROSS REFERENCE TO RELATED APPLICATION

This is a continuation-in-part (CIP) application of U.S. application Ser. No. 16/698,867 filed on 2019 Nov. 27 and claims priority to provisional U.S. Application No. 63/006,064 filed on 2020 Apr. 6, which is included herein by reference. U.S. application Ser. No. 16/698,867 filed on 2019 Nov. 27 is a continuation-in-part (CIP) application of U.S. application Ser. No. 16/157,106 filed on 2018 Oct. 11. U.S. application Ser. No. 16/157,106 claims priority to Taiwan Patent Application No. 107105524 filed on 2018 Feb. 14 and provisional Patent Application No. 62/607,922 filed on 2017 Dec. 20, and incorporated herein by reference in its entirety.

TECHNICAL FIELD

The invention is related to a wireless signal transceiver device, and more particularly, a wireless signal transceiver device including a dual-polarized antenna with at least two feed zones.

BACKGROUND

In the field of wireless communications, dual-polarized antennas are widely used to perform wireless signal reception and transmission. However, in order to perform transmitting and receiving functions of a dual-polarized antenna, a common method is to receive an external wireless signal into a system using a reception antenna, and transmit a wireless signal outwards from the system to an external environment using a transmission antenna. Although such a structure can be used to transmit and receive wireless signals, two antennas such as the reception antenna and the transmission antenna are required. The two antennas occupy a large space, thereby it is difficult to reduce an overall size of the system.

SUMMARY

An embodiment provides a wireless signal transceiver device comprising a dual-polarized antenna, a transmission circuit, a reception circuit and a processor. The dual-polarized antenna is configured to transmit a first wireless signal and receive a second wireless signal at the same time. The first wireless signal is reflected by an object to generate the second wireless signal. The dual-polarized antenna comprises a first feed zone and a second feed zone. The first feed zone is configured to receive a transmission signal, and the first wireless signal is generated according to at least the transmission signal. The second feed zone is configured to output a reception signal generated according to the second wireless signal. The dual-polarized antenna is configured to form a first radiated electric-field having a first co-polarization according to the first wireless signal and form a second radiated electric-field having a second co-polarization according to the second wireless signal. The first co-polarization and the second co-polarization form an angle between 45 degrees to 135 degrees to each other in a far field. The transmission circuit is configured to generate the transmission signal according to an input signal. The reception circuit is configured to generate a processing signal according to the reception signal. The processing unit is couple to the transmission circuit and the reception circuit, and configured to generate a spatial information of the object according to the processing signal and the input signal.

DETAILED DESCRIPTION

Figure 1:
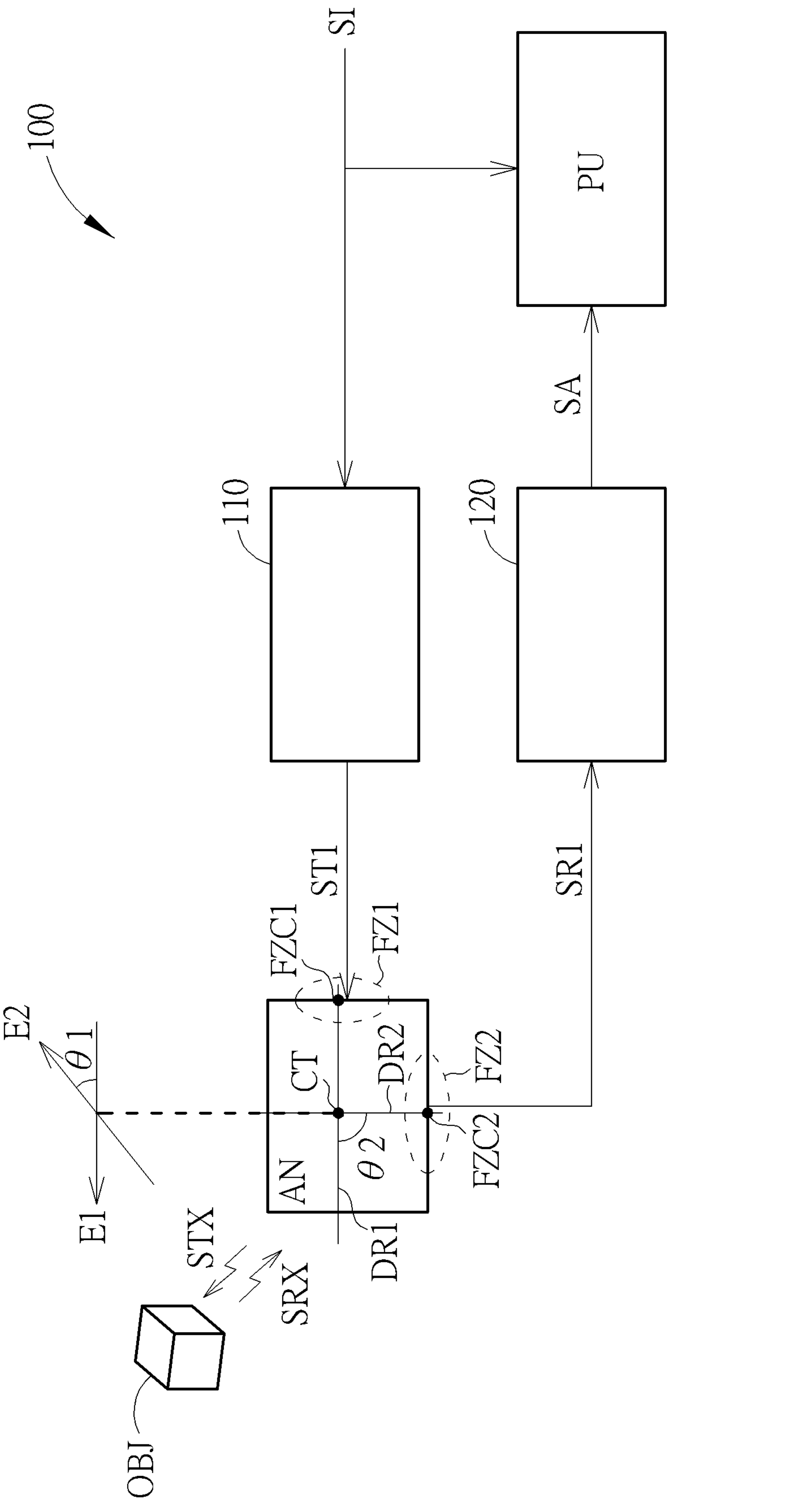
FIG. 1 illustrates a wireless signal transceiver device according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 illustrates a wireless signal transceiver device 100 according to an embodiment. The wireless signal transceiver device 100 includes a dual-polarized antenna AN, a transmission circuit 110, a reception circuit 120 and a processor PU. The dual-polarized antenna AN is used to transmit a first wireless signal STX and receive a second wireless signal SRX at the same time. The first wireless signal STX is reflected by an object OBJ to generate the second wireless signal SRX.

The dual-polarized antenna AN includes a first feed zone FZ1 and a second feed zone FZ2. The first feed zone FZ1 is used to receive a transmission signal ST1, and the first wireless signal STX is generated according to at least the transmission signal ST1. The second feed zone FZ2 is used to output a reception signal SR1 generated according to the second wireless signal SRX.

The dual-polarized antenna AN is used to form a first radiated electric-field E1 having a first co-polarization according to the first wireless signal STX and form a second radiated electric-field E2 having a second co-polarization according to the second wireless signal SRX. The first co-polarization and the second co-polarization form an angle θ1 between 45 degrees to 135 degrees to each other in a far field.

The transmission circuit 110 is used to generate the transmission signal ST1 according to an input signal SI. The reception circuit 120 is used to generate a processing signal SA according to the reception signal SR1. The processing unit PU is couple to the transmission circuit 110 and the reception circuit 120, and used to generate a spatial information of the object OBJ according to the processing signal SA and the input signal SI.

In FIG. 1, the wireless signal transceiver device 100 may be a radar device. The first wireless signal STX may be continuously transmitted while the second wireless signal SRX is continuously received during a time interval. When the object OBJ moves, a frequency shift may be generated according to Doppler effect. Hence, the processing unit PU may determine whether the object OBJ moves according to a frequency difference between the first wireless signal STX and the second wireless signal SRX. When the first wireless signal STX and the second wireless signal SRX have a substantially the same frequency, the object OBJ can be determined to keep stationary without moving.

As shown in FIG. 1, a first line DR1 may be defined from a shape centroid FZC1 of the first feed zone FZ to a shape centroid CT of the dual-polarized antenna AN. A second line DR2 may be defined from a shape centroid FZC2 of the second feed zone FZ2 to the shape centroid CT of the dual-polarized antenna AN. The first line DR1 and the second line DR2 may form an angle θ2 between 45 to 135 degrees for providing enough isolation between the signals accessed by the feed zones FZ1 and FZ2, and generating the first co-polarization and the second co-polarization in a far field as mentioned above. According to an embodiment, the angle θ2 may be adjusted to be 90 degrees to improve the isolation between the signals accessed by the feed zones FZ1 and FZ2. However, the locations of the feed zones FZ1 and FZ2 related to the lines DR1 and DR2 shown in FIG. 1 are merely of an example, and the location of each of the feed zones of an antenna can be adjusted according to the structure and the performance of the antenna.

Figure 2:
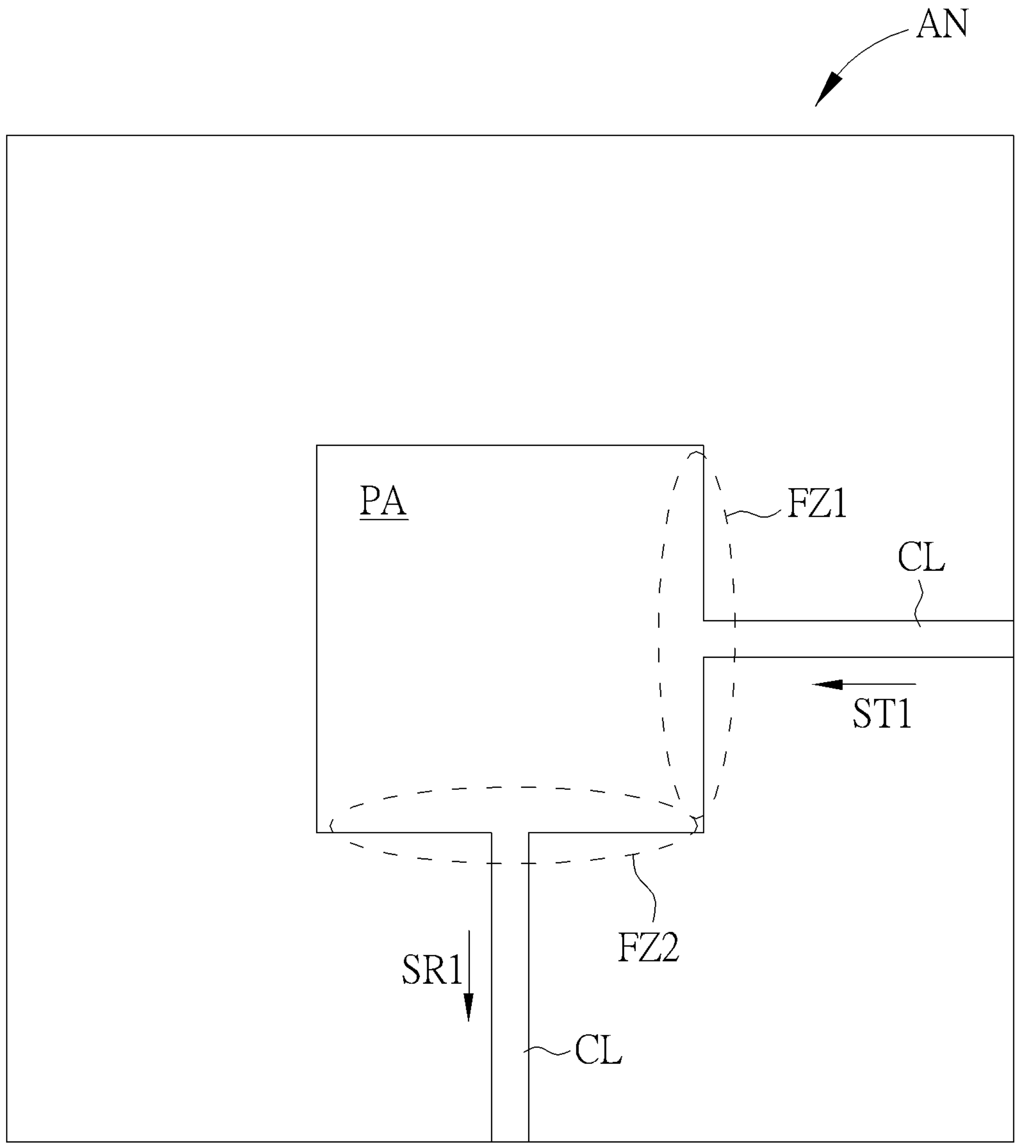
FIG. 2 and FIG. 3 respectively illustrate a top view and a side view of the dual-polarized antenna of FIG. 1.
Figure 3:
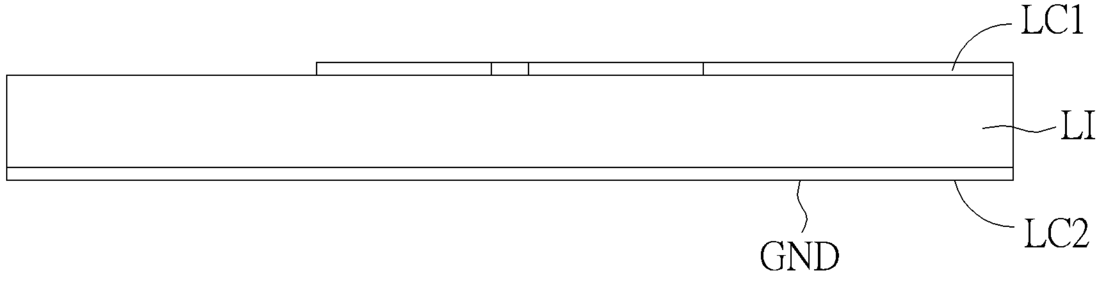

FIG. 2 and FIG. 3 respectively illustrate a top view and a side view of the dual-polarized antenna AN according to an embodiment. As shown in FIG. 2 and FIG. 3, the dual-polarized antenna AN may include a patch PA, a conductive line CL, a ground GND, an insulation layer LI. The patch PA may be formed on a first conductive layer LC1. The conductive line CL may be formed on the first conductive layer LC1, coupled to one of the first feed zone FZ1 and the second feed zone FZ2, and used to access the transmission signal ST1 or the reception signal SR1 accordingly. The ground GND may be formed on a second conductive layer LC2. The insulation layer LI may be located between the first conductive layer LC1 and the second conductive layer LC2. The first conductive layer LC1 may or may not be insulated from the second conductive layer LC2 according to embodiments. In FIG. 2 and FIG. 3, the conductive line CL may be a microstrip line. Each insulation layer mentioned in the text may be a substrate.

Figure 4:
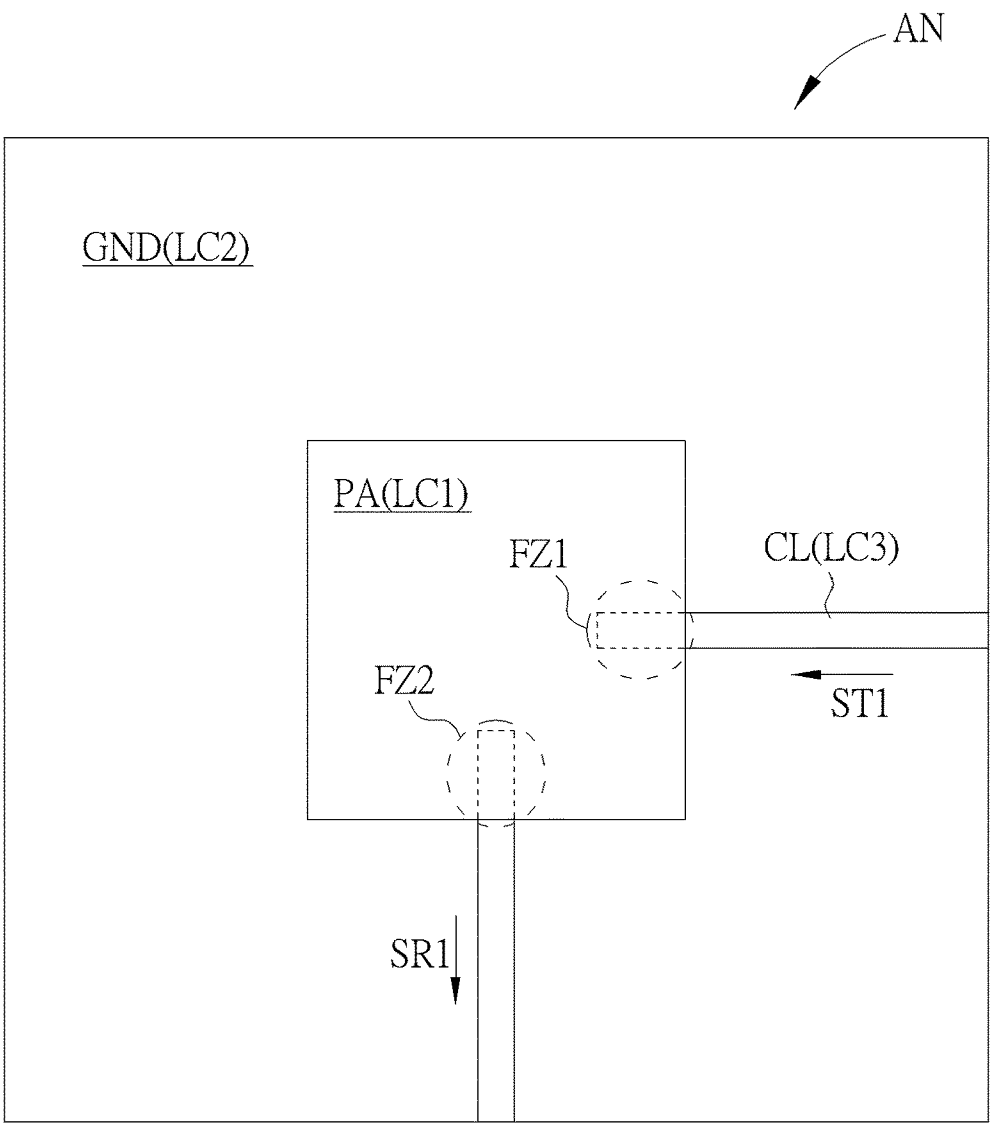
FIG. 4 and FIG. 5 respectively illustrate a top view and a side view of the dual-polarized antenna according to another embodiment.
Figure 5:
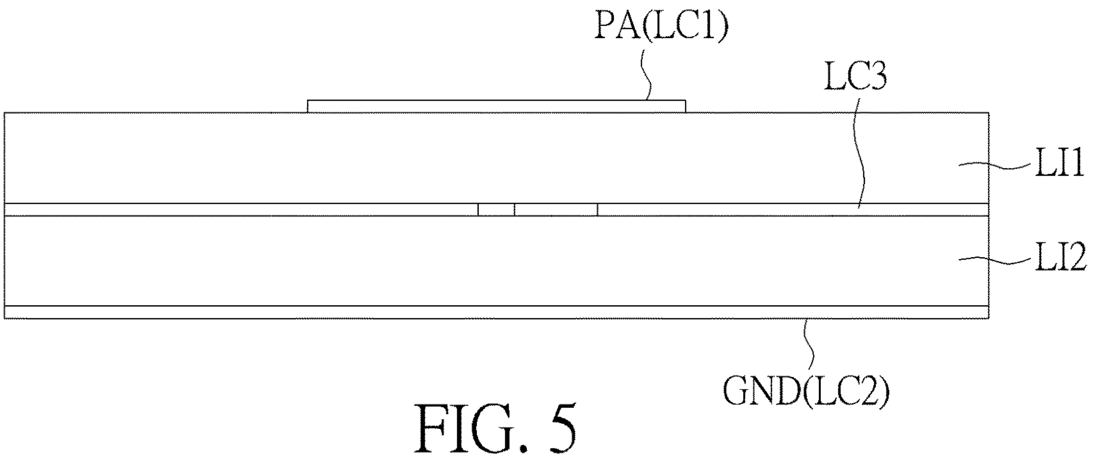

FIG. 4 and FIG. 5 respectively illustrate a top view and a side view of the dual-polarized antenna AN according to another embodiment. As shown in FIG. 4 and FIG. 5, the dual-polarized antenna AN may include a patch PA, a ground GND, a conductive line CL, a first insulation layer LI1 and a second insulation layer LI2. The patch PA may be formed on a first conductive layer LC1. The ground GND may be formed on a second conductive layer LC2. The conductive line CL may be formed on a third conductive layer LC3, disposed to overlap one of the first feed zone FZ1 and the second feed zone FZ2, and used to access the transmission signal ST1 or the reception signal SR1 accordingly. The first insulation layer LI1 may be located between the first conductive layer LC1 and the third conductive layer LC3. The second insulation layer LI2 may be located between the second conductive layer LC2 and the third conductive layer LC3. As shown in FIG. 5, the third conductive layer LC3 may be located between the first conductive layer LC1 and the second conductive layer LC2. The first conductive layer LC1, the second conductive layer LC2 and the third conductive layer LC3 may or may not be insulated from one another according to embodiments. In FIG. 4 and FIG. 5, the conductive line CL may be a microstrip line.

Figure 6:
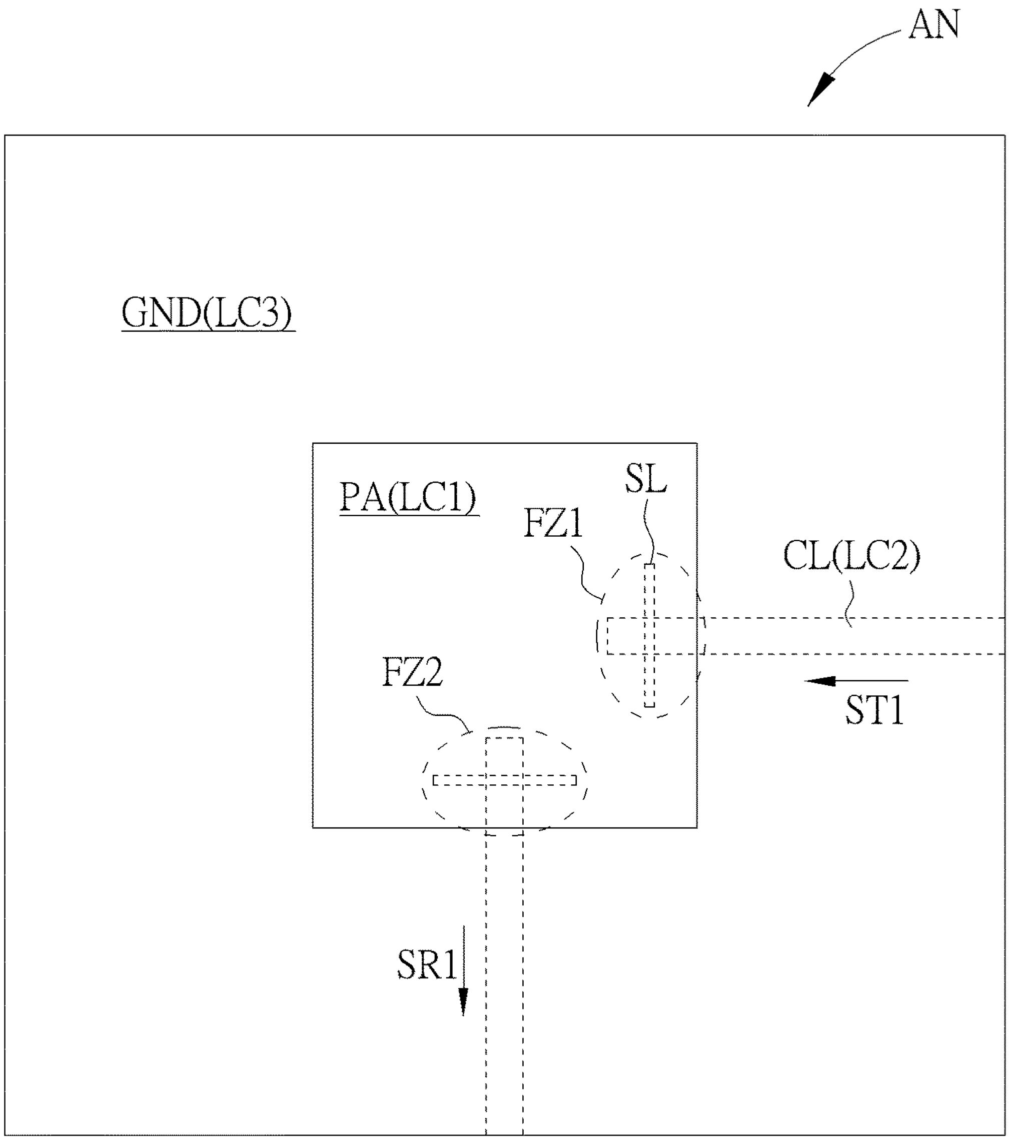
FIG. 6 and FIG. 7 respectively illustrate a top view and a side view of the dual-polarized antenna according to another embodiment.
Figure 7:
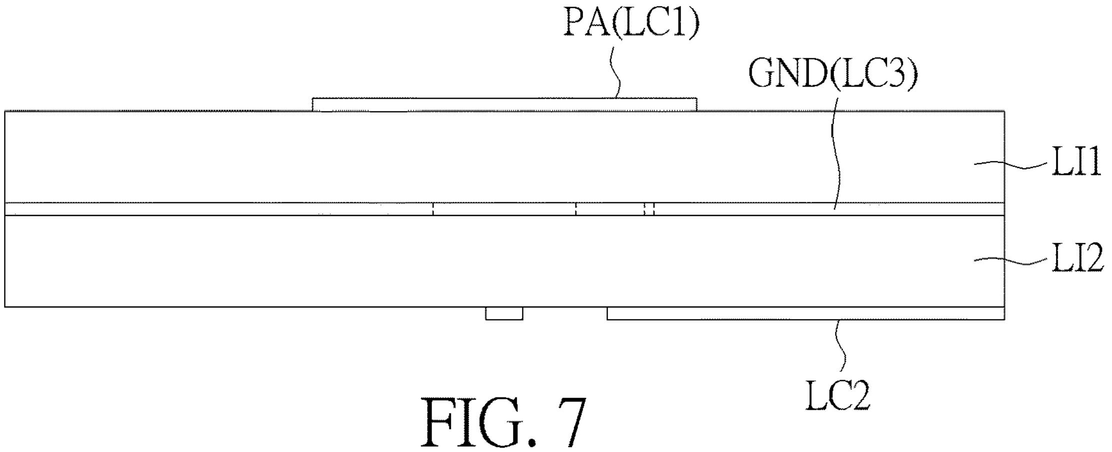

FIG. 6 and FIG. 7 respectively illustrate a top view and a side view of the dual-polarized antenna AN according to another embodiment. The dual-polarized antenna AN may include a patch PA, a conductive line CL, a ground GND, a slot SL, a first insulation layer LI1 and a second insulation layer LI2. The patch PA may be formed on a first conductive layer LC1. The conductive line CL may be formed on a second conductive layer LC2, disposed to overlap one of the first feed zone FZ1 and the second feed zone FZ2, and used to access the transmission signal ST1 or the reception signal SR1 accordingly. The ground GND may be formed on a third conductive layer LC3. The slot SL may be generated on the third conductive layer LC3 and located between the conductive line CL and the patch PA. The first insulation layer LI1 may be located between the first conductive layer LC1 and the third conductive layer LC3. The second insulation layer LI2 may be located between the third conductive layer LC3 and the second conductive layer LC2. The third conductive layer LC3 may be between the first conductive layer LC1 and the second conductive layer LC2. The first conductive layer LC1, the second conductive layer LC2 and the third conductive layer LC3 may or may not be insulated from one another according to embodiments. In FIG. 6 and FIG. 7, signals may be transmitted between the patch PA and the conductive line CL with the coupling effect through the slot SL.

In some embodiments, the slot SL has a narrow rectangular shape, and in some other embodiments, the slot SL may have a rectangular shape, an H shape, a circular shape, an oval shape or an irregular shape. Each of the first feed zone FZ1 and the second feed zone FZ2 may be located near a side of the patch PA, a center of the patch PA or a corner of the patch PA. For example, when the first feed zone FZ1 is near the bottom right corner of the patch PA, the slot SL may be formed at the bottom right corner of the patch PA, and the conductive line CL may overlap the bottom right corner of the patch PA.

In FIG. 2 to FIG. 7, the conductive line CL may be a line (e.g. a microstrip line) coupled to one of the transmission circuit 110 and the reception circuit 120. However, in the dual-polarized antenna AN, a conductive element coupled to the transmission circuit 110 and the reception circuit 120 may be a probe instead of being limited to a line.

Figure 8:
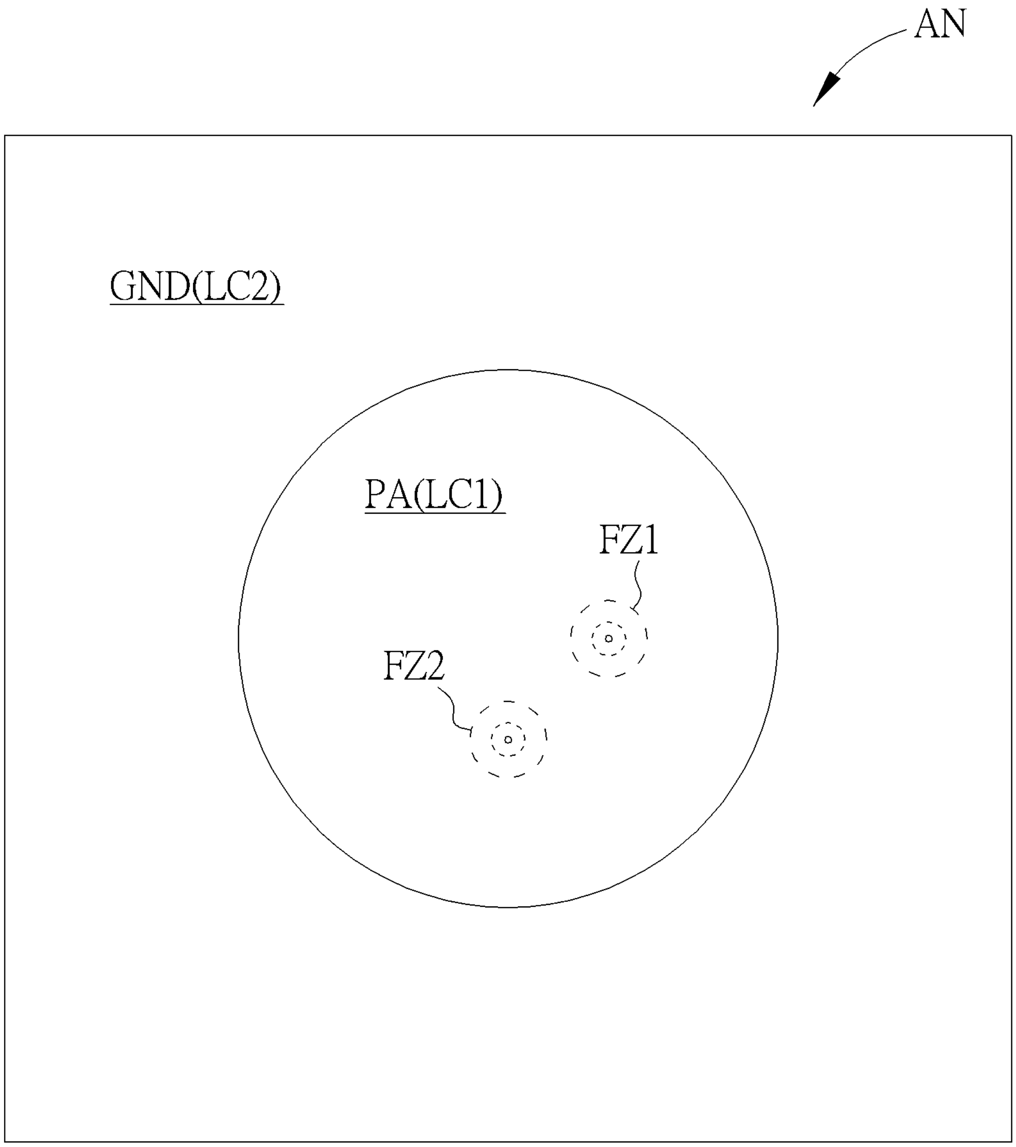
FIG. 8 and FIG. 9 respectively illustrate a top view and a side view of the dual-polarized antenna according to another embodiment.
Figure 9:
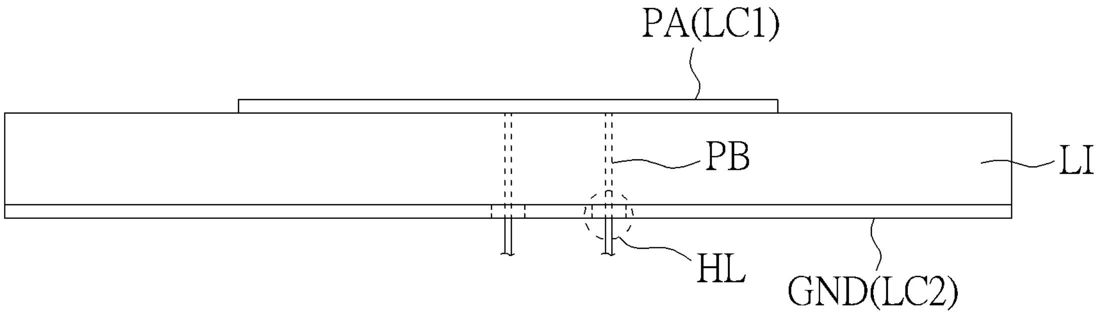

FIG. 8 and FIG. 9 respectively illustrate a top view and a side view of the dual-polarized antenna AN according to another embodiment. As shown in FIG. 8 and FIG. 9, the dual-polarized antenna AN may include a patch PA, a ground GND, a hole HL, a probe PB and an insulation layer LI. The patch PA may be formed on a first conductive layer LC1. The ground GND may be formed on a second conductive layer LC2. The hole HL may be formed on the second conductive layer LC2 and disposed to overlap one of the first feed zone FZ1 and the second feed zone FZ2. The probe PB may be disposed through the hole HL. The probe PB may include a first terminal coupled to the patch PA and a second terminal coupled to one of the transmission circuit 110 and the reception circuit 120. The probe PB may be used to access the transmission signal ST1 or the reception signal SR1 accordingly. The insulation layer LI may be located between the first conductive layer LC1 and the second conductive layer LC2. The first conductive layer LC1 may or may not be insulated from the second conductive layer LC2.

In FIG. 8, the patch PA has a circular shape as an example, and the patch PA may have another shape such as the rectangular shape shown in FIG. 2.

Figure 10:
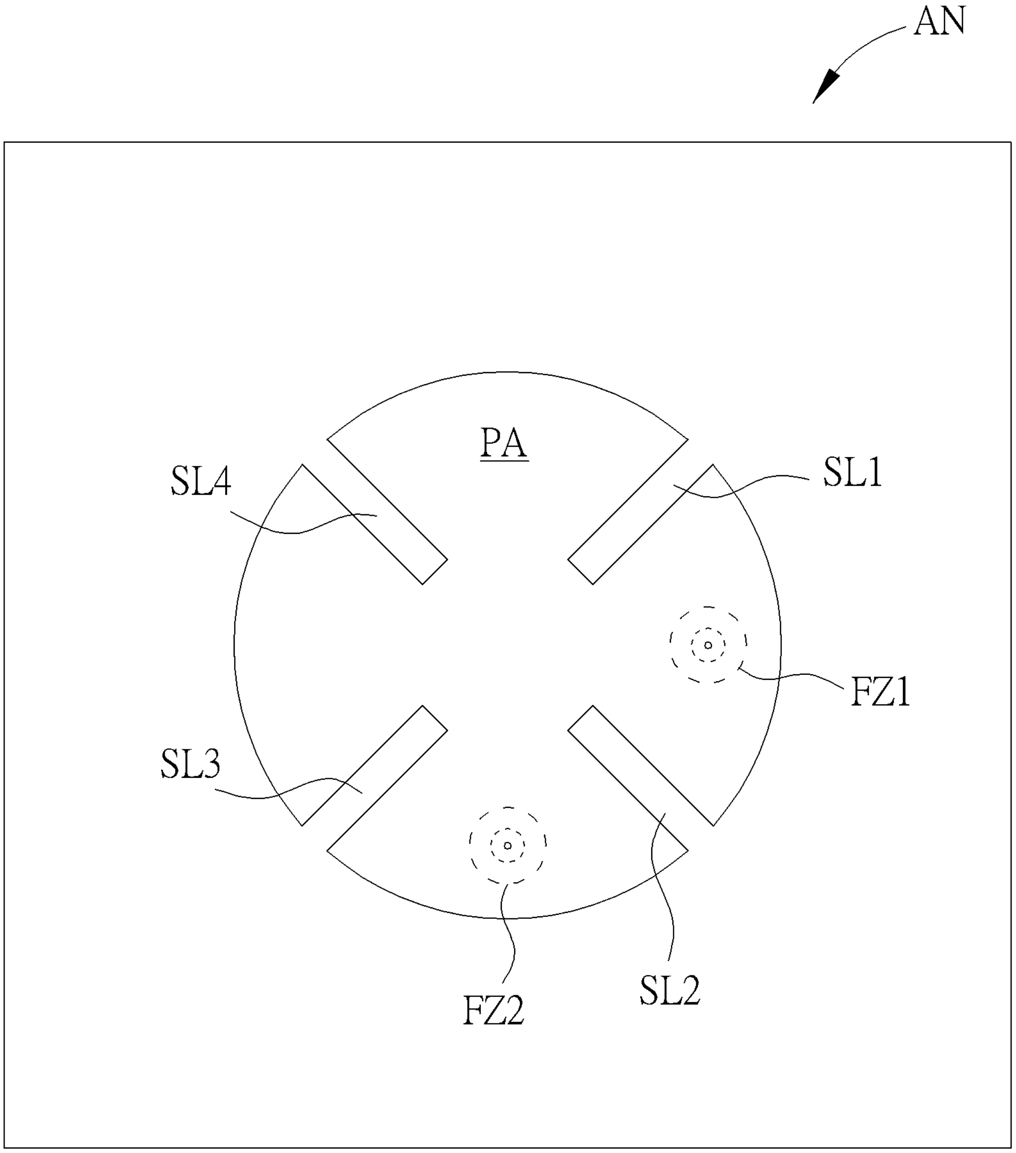
FIG. 10 illustrates a top view of the dual-polarized antenna according to another embodiment.

FIG. 10 illustrates a top view of the dual-polarized antenna AN according to another embodiment. The patch PA in FIG. 10 may be similar to that in FIG. 8 and further includes a first slot SL1, a second slot SL2, a third slot SL3 and a fourth slot SL4. The first slot SL1, the second slot SL2, the third slot SL3 and the fourth slot SL4 may be formed on the patch PA and disposed to respectively cut off a first part, a second part, a third part and a fourth part of an edge of the patch PA. The first feed zone FZ1 may be located between the first slot SL1 and the second slot SL2. The second feed zone FZ2 may be located between the second slot SL2 and the third slot SL3. The second slot SL2 may be opposite to the fourth slot SL4, and the first slot SL1 may be opposite to the third slot SL3.

In the example of FIG. 10, each slot has a long straight shape; however, embodiments are not limited thereto. Each slot may have another shape such as a triangular shape or an L shape as shown in FIG. 11.

Figure 11:
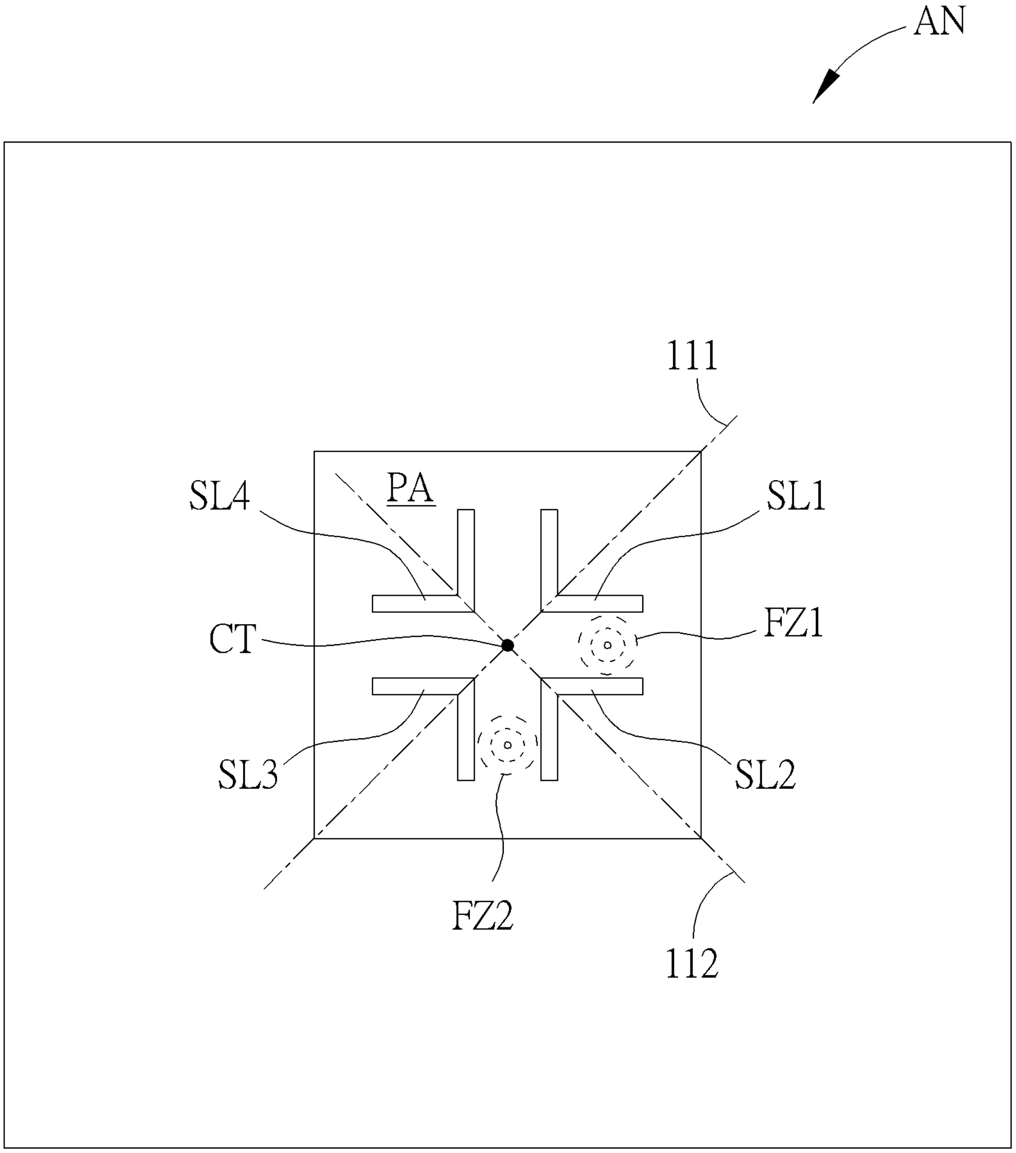
FIG. 11 illustrates a top view of the dual-polarized antenna according to another embodiment.

FIG. 11 illustrates a top view of the dual-polarized antenna AN according to another embodiment. In FIG. 11, a first slot SL1, a second slot SL2, a third slot SL3 and a fourth slot SL4 may be formed on the patch PA. The slots SL1 to SL4 may be symmetrically disposed around a shape centroid CT of the patch PA. Each of the slots SL1 to SL4 can have a substantially same shape. The first slot SL1 may be opposite to the third slot SL3, and the second slot SL2 may be opposite to the fourth slot SL4.

According to embodiments, the shape of each of the slots SL1 to SL4 may be (but not limited to be) an I-shape or a non-linear shape. For example, the non-linear shape may be (but not limited to be) an arc shape or an L shape. In FIG. 11, the slots SL1 to SL4 each has an L shape as an example instead of limiting the scope of embodiments. Moreover, with regarding the shape centroid CT, the slots SL1 and SL3 may be of point symmetry (i.e. rotational symmetry) with one another; and the slots SL2 and SL4 may be of point symmetry with one another.

In the example of FIG. 11, each of the first slot SL1, the second slot SL2, the third slot SL3 and the fourth slot SL4 may have an L shape so as to have a first part, a second part and a turning point connected to the first part and the second part. For example, the first slot SL1 may have a first part and a second part perpendicular to each other.

As shown in FIG. 11, a first line 111 may be defined by a turning point of the first slot SL1 and a turning point of the third slot SL3. A second line 112 may be defined by a turning point of the second slot SL2 and a turning point of the fourth slot SL4. A shape centroid CT of the patch PA may be on a cross point of the first line 111 and the second line 112. However, FIG. 11 is merely an example, and the locations of the slots may not be exactly symmetrical as long as the performance of the dual-polarized antenna AN is acceptable.

According to an embodiment, when the patch PA has a rectangular shape with four sides, the first part and/or the second part of each of the first slot SL1, the second slot SL2, the third slot SL3 and the fourth slot SL4 may be substantially parallel to one of the sides of the patch PA. In another example, the first part and/or the second part of each of the slots may not be parallel to one of the sides of the patch PA.

By cutting slots on the patch PA, since the currents may flow along the edges of the slots, the path of the current may be lengthened, and the area of the patch PA may be reduced for accessing signals of the same frequency. In other words, the size of the antenna can be reduced.

Figure 12:
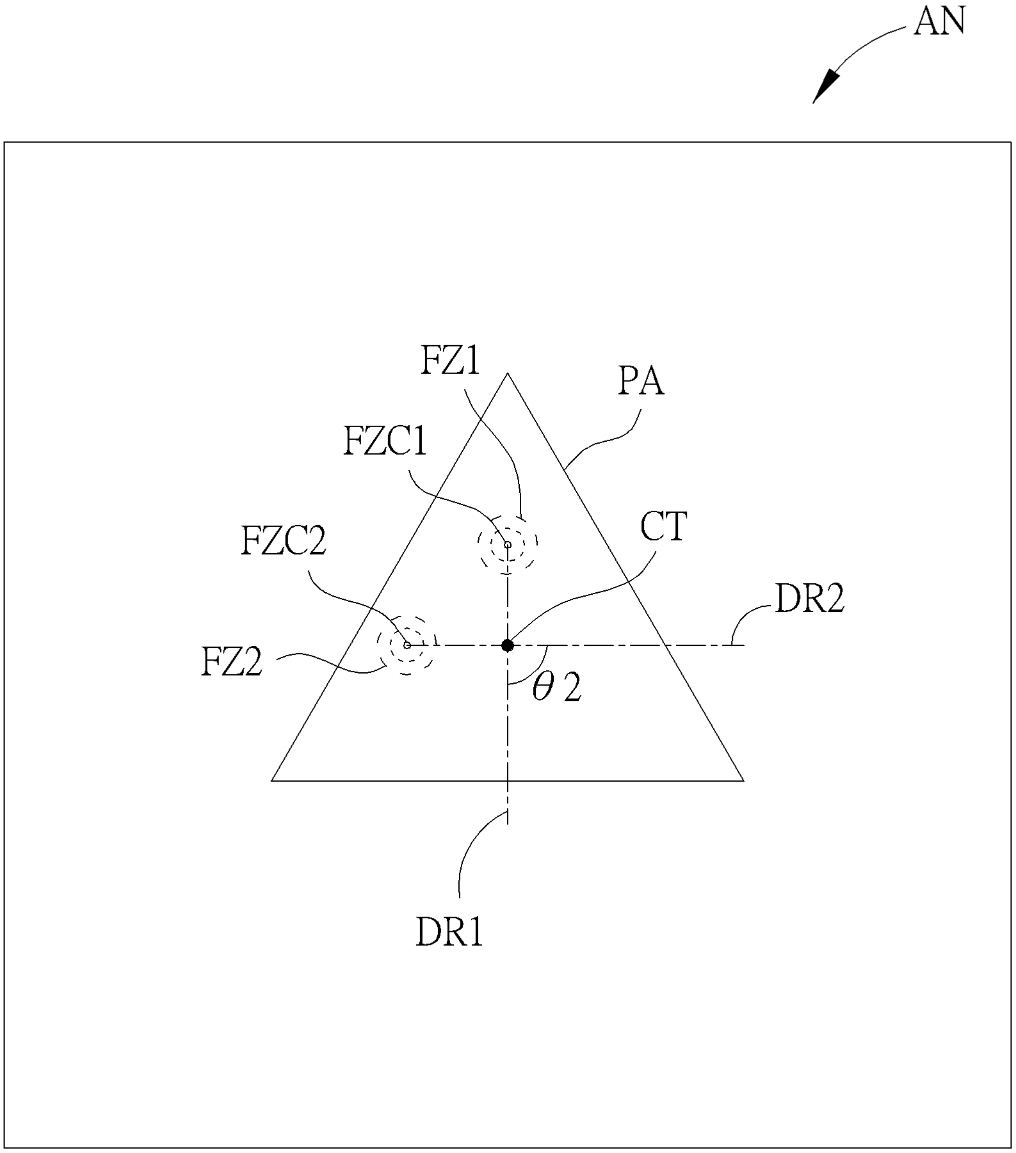
FIG. 12 illustrates a top view of the dual-polarized antenna according to another embodiment.

FIG. 12 illustrates a top view of the dual-polarized antenna AN according to another embodiment. FIG. 12 may be similar to FIG. 8; however, unlike FIG. 8, the patch PA may have a triangular shape. The first line DR1 may be defined by the shape centroid FZC1 of the first feed zone FZ1 and the shape centroid CT of the patch PA. The second line DR2 may be defined by the shape centroid FZC2 of the second feed zone FZ2 and the shape centroid CT. The first line DR1 and the second line DR2 may also form the angle $\theta 2$ between 45 degrees to 135 degrees.

Figure 13:
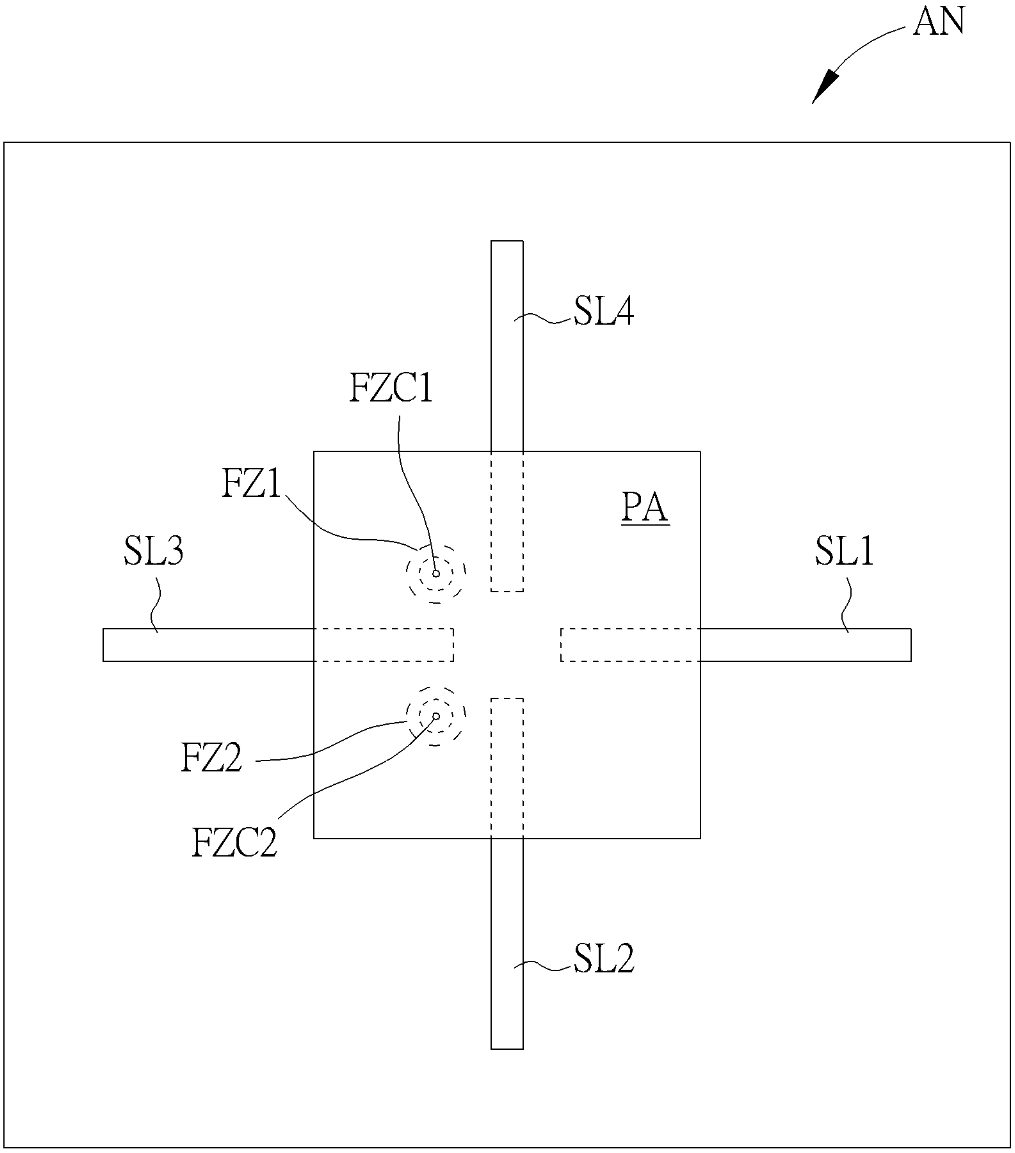
FIG. 13 illustrates a top view of the dual-polarized antenna according to another embodiment.

FIG. 13 illustrates a top view of the dual-polarized antenna AN according to another embodiment. FIG. 13 may be similar to FIG. 8; however, unlike FIG. 8, the patch PA may have a rectangular shape in FIG. 13, and a plurality of slots may be formed on the ground GND in FIG. 13. As shown in FIG. 13, a first slot SL1, a second slot SL2, a third slot SL3 and a fourth slot SL4 may be formed on the ground GND formed on the second conductive layer LC2 (where the second conductive layer LC2 is shown in FIG. 9). A shape centroid FZC1 of the first feed zone FZ1 may overlap an area between two adjacent slots (e.g., the slots SL3 and SL4) of the first slot SL1 to the fourth slot SL4. A shape centroid FZC2 of the second feed zone may overlap an area between another two adjacent slots (e.g., the slots SL2 and SL3) of the first slot SL1 to the fourth slot SL4.

Figure 14:
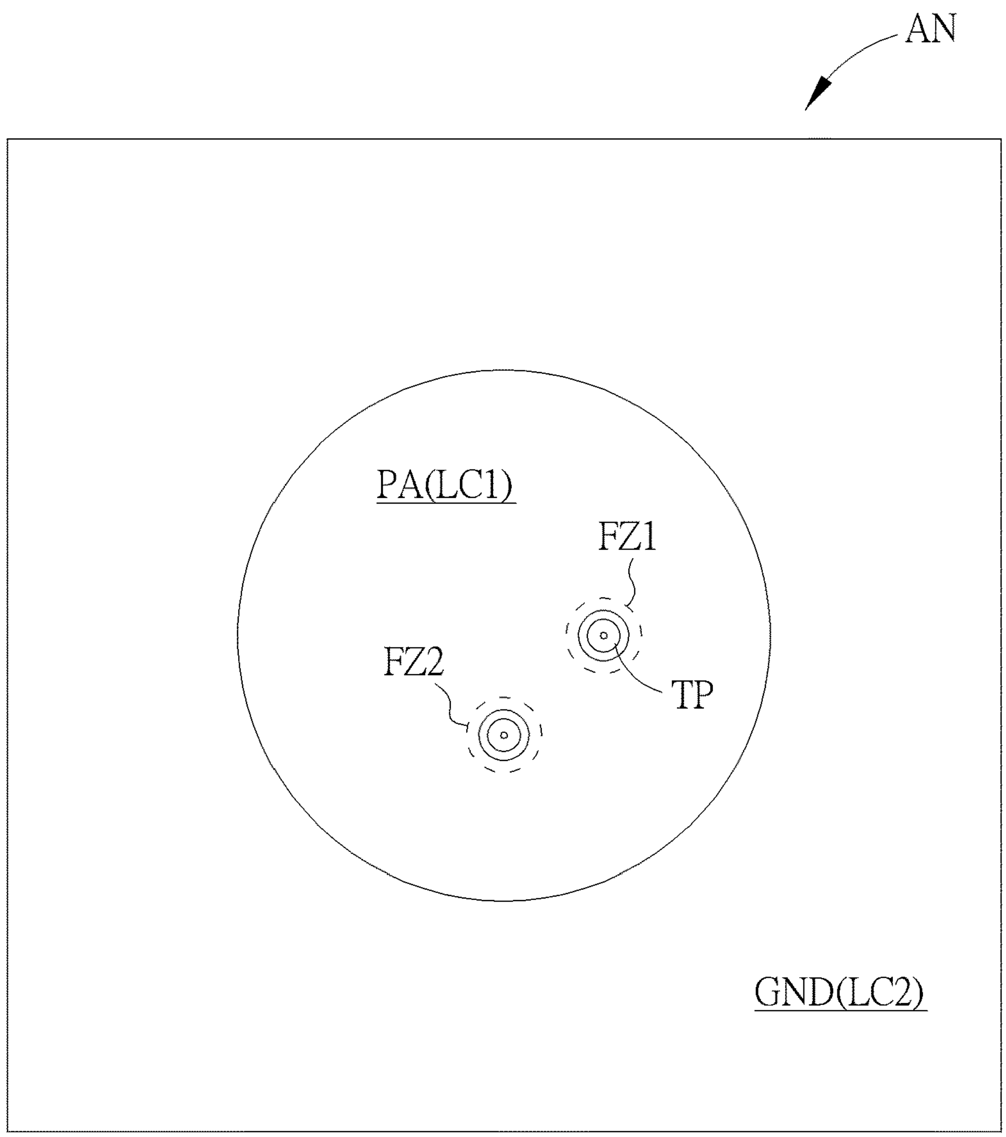
FIG. 14 and FIG. 15 respectively illustrate a top view and a partial side view of the dual-polarized antenna according to another embodiment.
Figure 15:
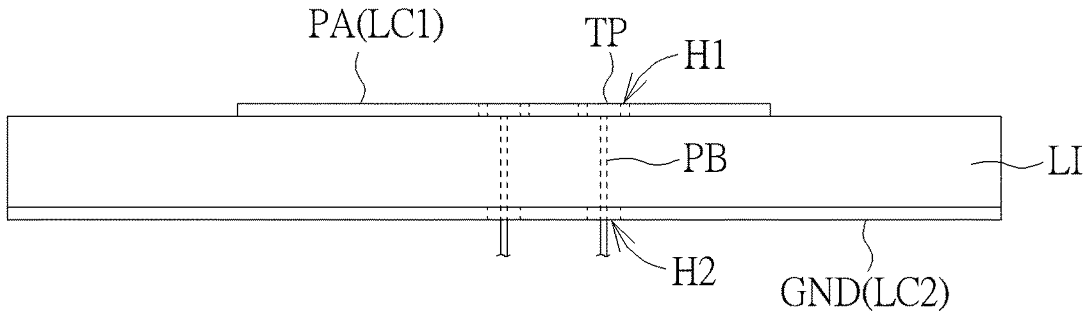

FIG. 14 and FIG. 15 respectively illustrate a top view and a partial side view of the dual-polarized antenna AN according to another embodiment. The dual-polarized antenna AN in FIG. 14 may include a patch PA, a ground GND and an insulation layer LI like FIG. 8 and FIG. 9, and further include a conductive top portion TP and a probe PB. The patch PA may be formed on a first conductive layer LC1 and include a first hole H1. The ground GND may be formed on a second conductive layer LC2 and include a second hole H2. The insulation layer LI may be formed between the first conductive layer LC1 and the second conductive layer LC2. The conductive top portion TP may be formed on the first conductive layer LC1 and located in the first hole H1. The probe PB may be located through the second hole H2. The probe PB may include a first terminal coupled to the conductive top portion TP and a second terminal coupled to one of the transmission circuit 110 and the reception circuit 120. The probe PB may be used to access the transmission signal ST1 or the reception signal SR1 accordingly. The first hole H1 and the second hole H2 may overlap one of the first feed zone FZ1 and the second feed zone FZ2. The probe PB and the conductive top portion TP may be insulated from each of the first conductive layer LC1 and the second conductive layer LC2. The first conductive layer LC1 may or may not be insulated from the second conductive layer LC2 according to embodiments. As shown in FIG. 14 and FIG. 15, the conductive top portion TP and the probe PB may form a "pushpin" shape, and transmit and receive signals to and from the patch PA with the coupling effect.

Figure 16:
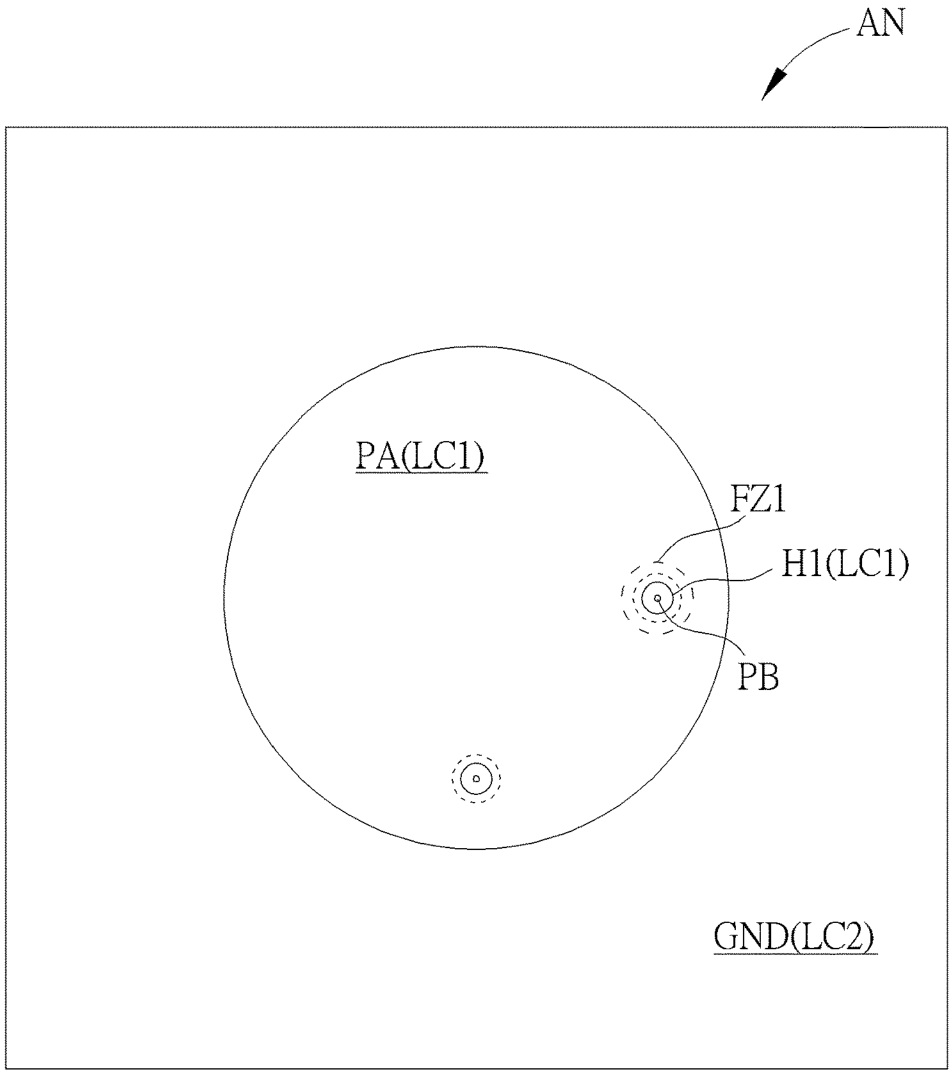
FIG. 16 illustrates a top view of the dual-polarized antenna according to another embodiment.
Figure 17:
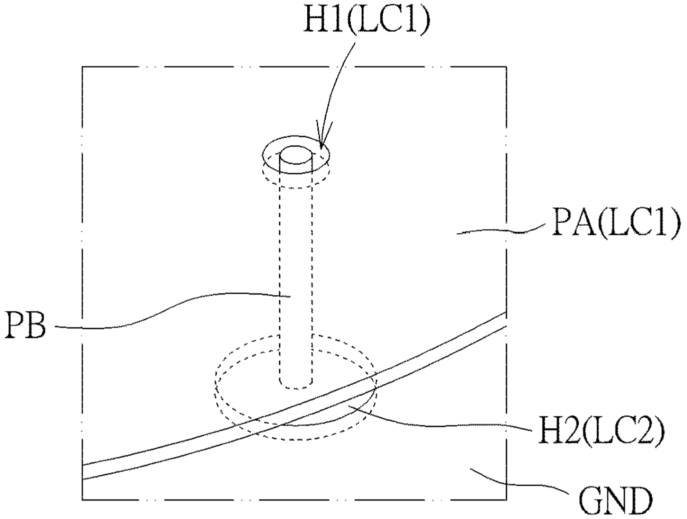
FIG. 17 illustrates a perspective view of the dual-polarized antenna in FIG. 16.

FIG. 16 illustrates a top view of the dual-polarized antenna AN according to another embodiment. FIG. 17 illustrates a perspective view of the dual-polarized antenna AN in FIG. 16. The dual-polarized antenna AN in FIG. 16 and FIG. 17 may be similar to that in FIG. 14 and FIG. 15; however, the dual-polarized antenna AN in FIG. 16 and FIG. 17 may not include the conductive top portion TP. As the dual-polarized antenna AN in FIG. 14, in FIG. 16 and FIG. 17, the probe PB may transmit and receive signals to and from the patch PA with the coupling effect.

Figure 18:
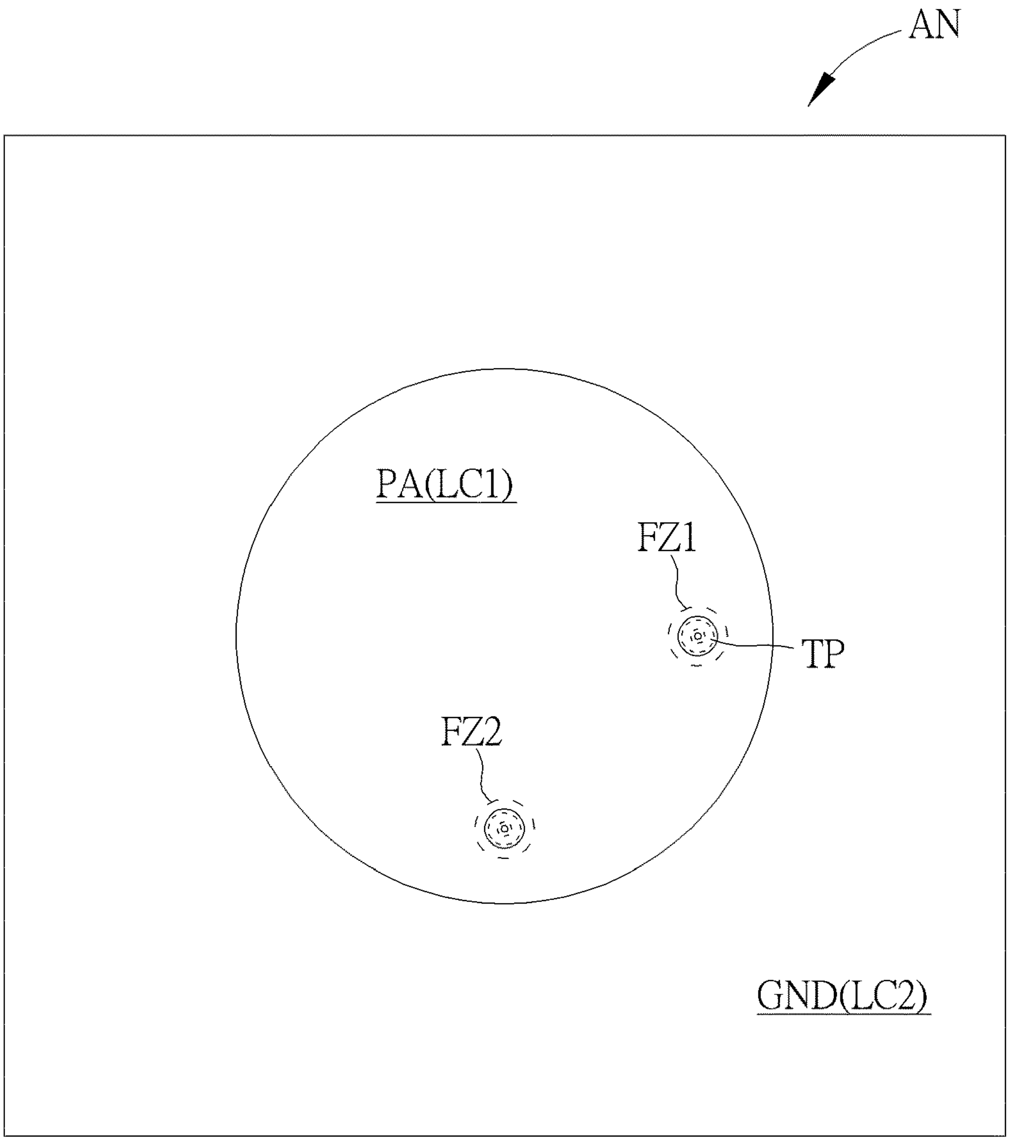
FIG. 18 and FIG. 19 respectively illustrate a top view and a partial side view of the dual-polarized antenna according to another embodiment.
Figure 19:
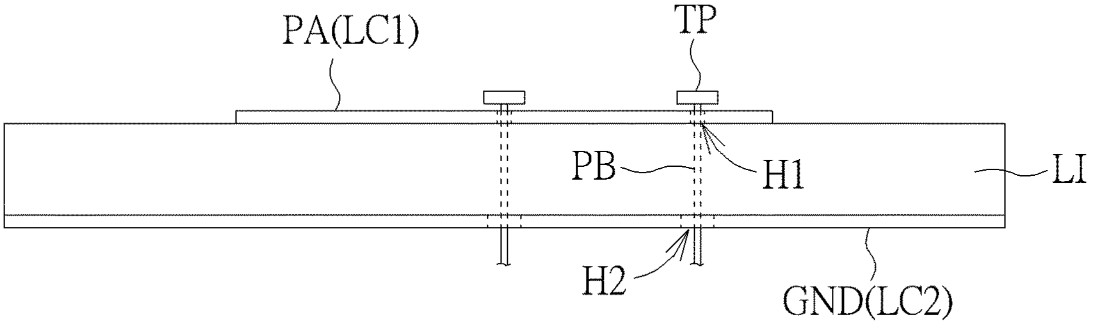

FIG. 18 and FIG. 19 respectively illustrate a top view and a partial side view of the dual-polarized antenna AN according to another embodiment. The dual-polarized antenna AN in FIG. 18 and FIG. 18 may be similar to that in FIG. 14 and FIG. 15; however, the conductive top portion TP in FIG. 18 and FIG. 19 may be located above the first hole H1 and the first conductive layer LC1 instead of in the first hole H1. Hence, the diameter of the conductive top portion TP in FIG. 18 and FIG. 19 may be larger than the diameter of the first hole H1. The conductive top portion TP may be generated using a conductive layer located above the first conductive layer LC1 and the second conductive layer LC2.

Figure 20:
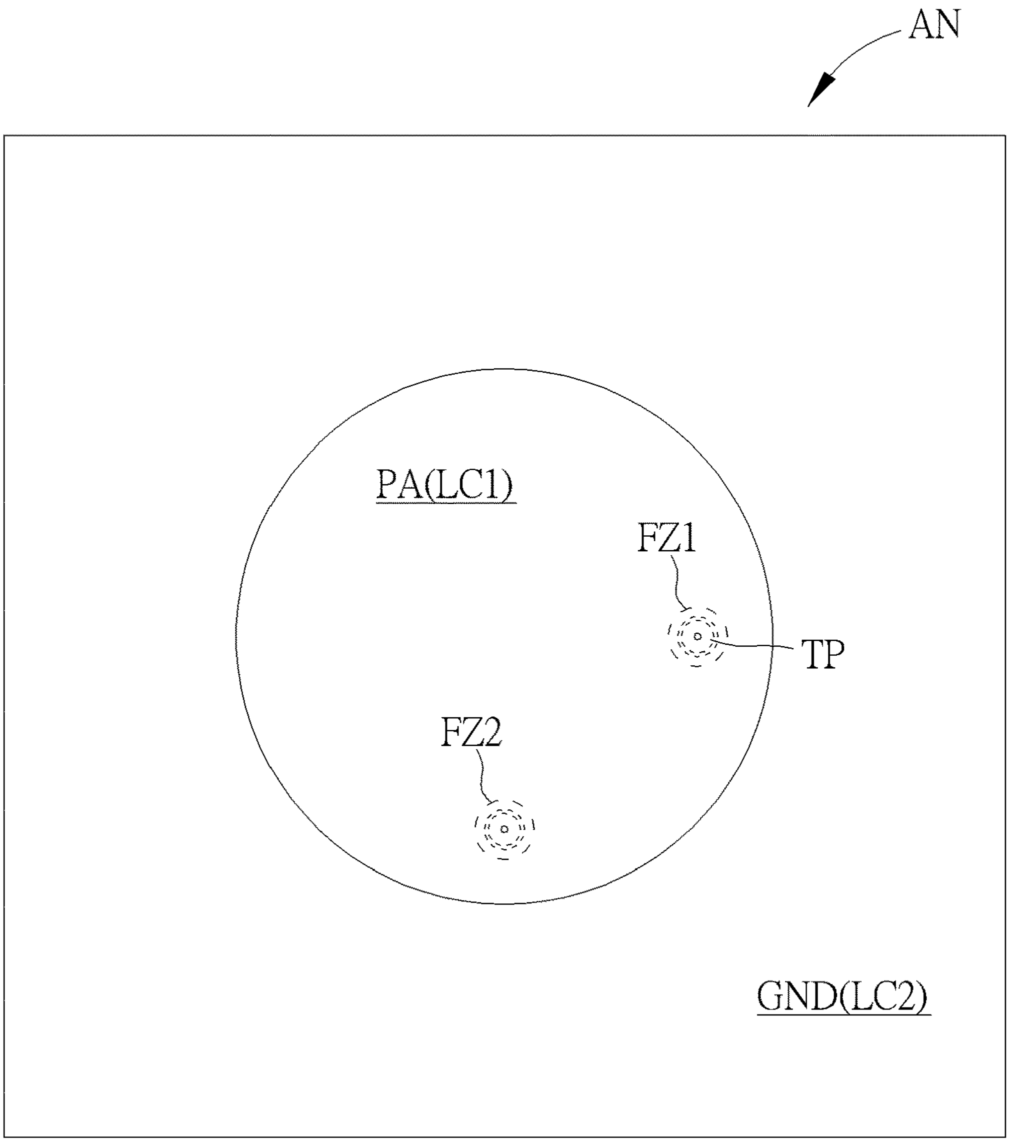
FIG. 20 illustrates a top view of the dual-polarized antenna according to another embodiment.
Figure 21:
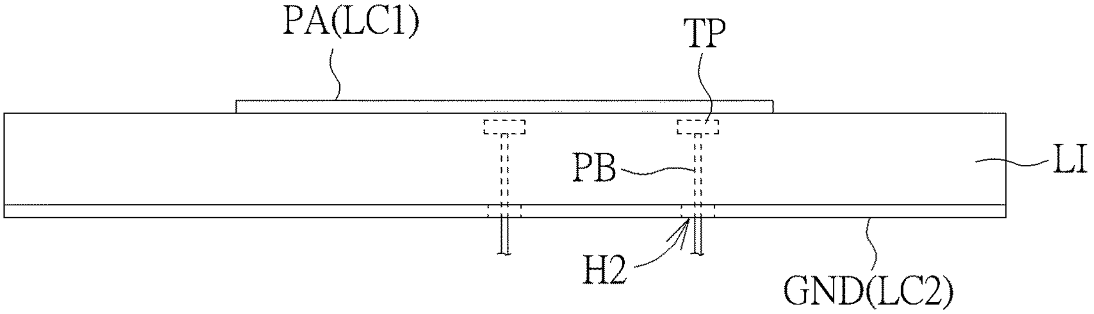
FIG. 21 illustrates a partial side view of the dual-polarized antenna in FIG. 20.

FIG. 20 illustrates a top view of the dual-polarized antenna AN according to another embodiment. FIG. 21 illustrates a partial side view of the dual-polarized antenna AN in FIG. 20. The dual-polarized antenna AN in FIG. 20 may be similar to that in FIG. 14; however, in FIG. 20, the conductive top portion TP may be located between the first conductive layer LC1 and the second conductive layer LC2 instead of being located in a hole on the first conductive layer LC1. Hence, as shown in FIG. 20 and FIG. 21, the second conductive layer LC2 may have a hole H2 while no hole is generated on the first conductive layer LC1. The conductive top portion TP may be generated using a conductive layer located between the first conductive layer LC1 and the second conductive layer LC2.

As shown in FIG. 20 and FIG. 21, the conductive top portion TP may have a circular shape; however, the conductive top portion TP may be in another shape. For example, the top conductive portion TP may have a rectangular shape, a square shape, an oval shape, a circular shape or an irregular shape. The top conductive portion TP may have a first side and a second side, and the first terminal of the probe PB may be coupled to the second side of top conductive portion TP.

Figure 22:
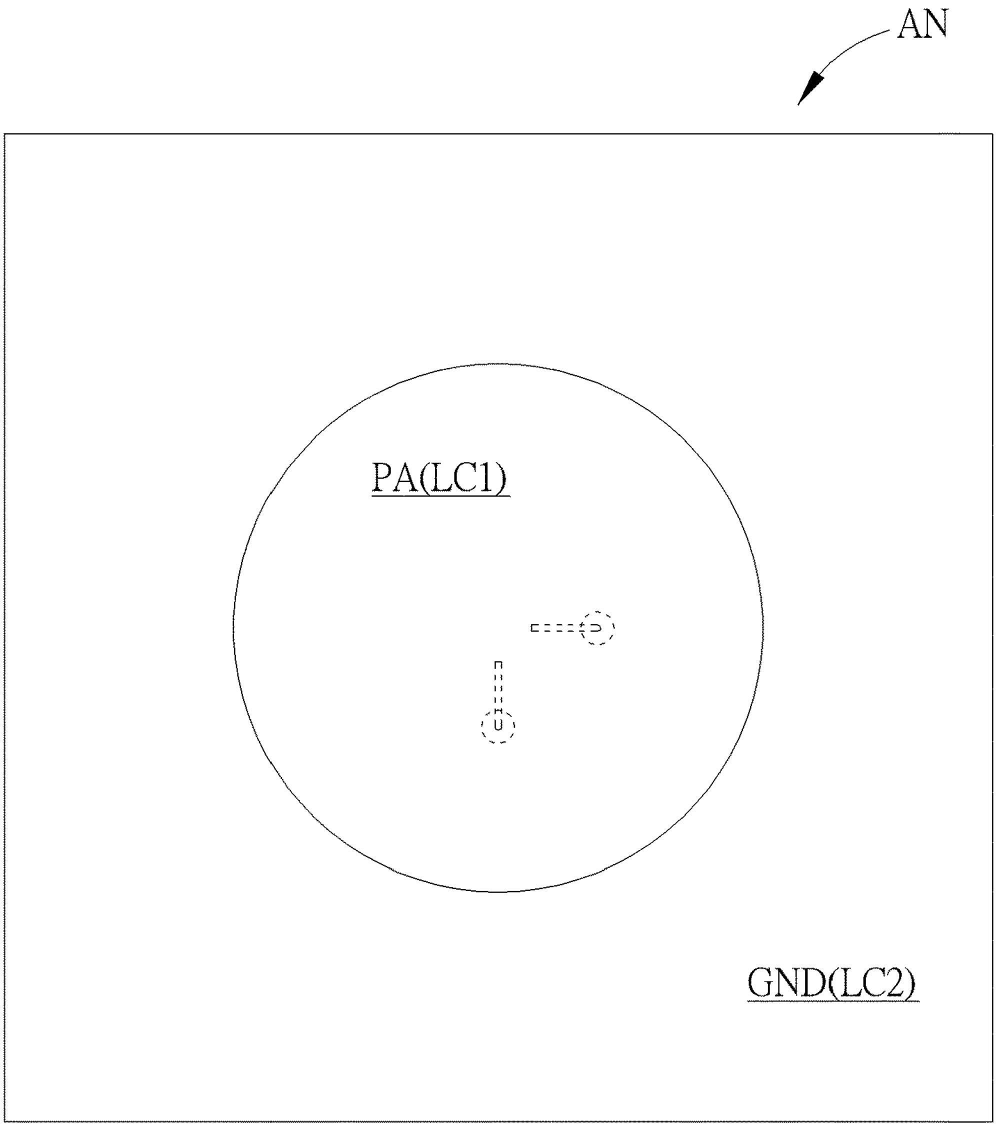
FIG. 22 illustrates a top view of the dual-polarized antenna according to another embodiment.
Figure 23:
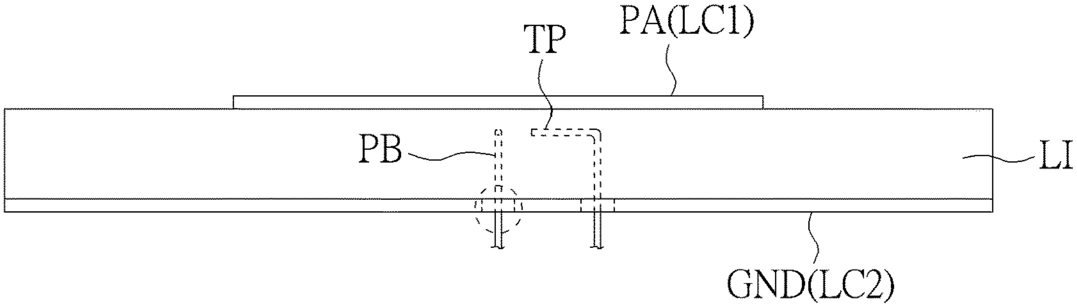
FIG. 23 illustrates a side view of the dual-polarized antenna in FIG. 22.

FIG. 22 illustrates a top view of the dual-polarized antenna AN according to another embodiment. FIG. 23 illustrates a side view of the dual-polarized antenna AN in FIG. 22. The dual-polarized antenna AN in FIG. 22 and FIG. 23 may be similar to that in FIG. 20 and FIG. 21; however, the top conductive portion TP in FIG. 22 and FIG. 23 may have a first terminal and a second terminal coupled to the first terminal of the probe PB, and the top conductive portion TP may be substantially perpendicular to the probe PB. In other words, the top conductive portion TP and the probe PB may form a turned L shape structure.

Figure 24:
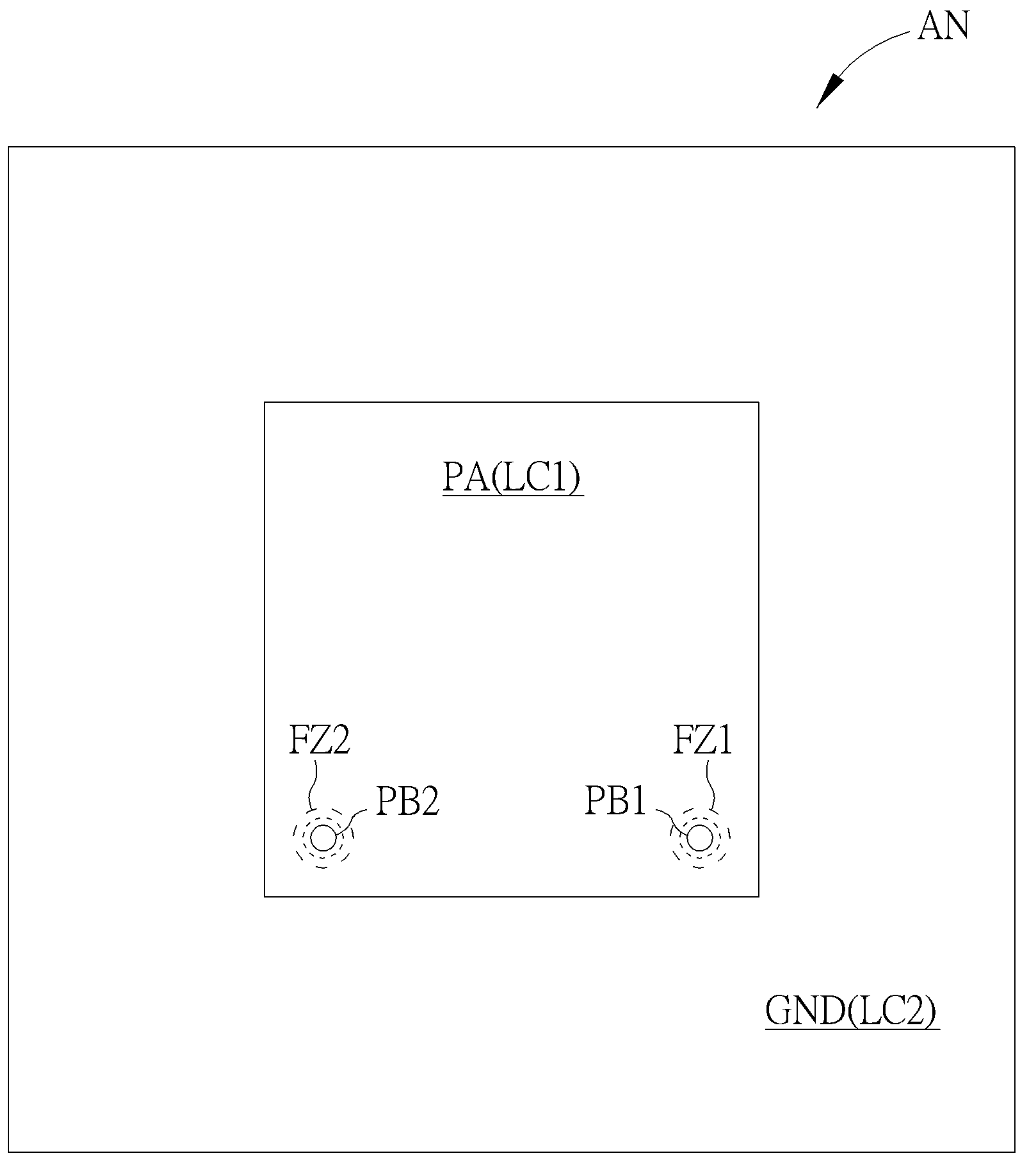
FIG. 24 illustrates a top view of the dual-polarized antenna according to another embodiment.

FIG. 24 illustrates a top view of the dual-polarized antenna AN according to another embodiment. The dual-polarized antenna AN in FIG. 24 may be similar to that in FIG. 14, FIG. 16, FIG. 18, FIG. 20 or FIG. 22. However, in FIG. 24, the patch PA may have a rectangular shape, and the two probes PB1 and PB2 of the dual-polarized antenna AN in FIG. 24 may be located at two corners of the patch PA. The two probes PB1 and PB2 may be used to transmit and receive signals to the reception circuit 120 and from the transmission circuit 110 and may access signals with the patch PA using the coupling effect.

Figure 25:
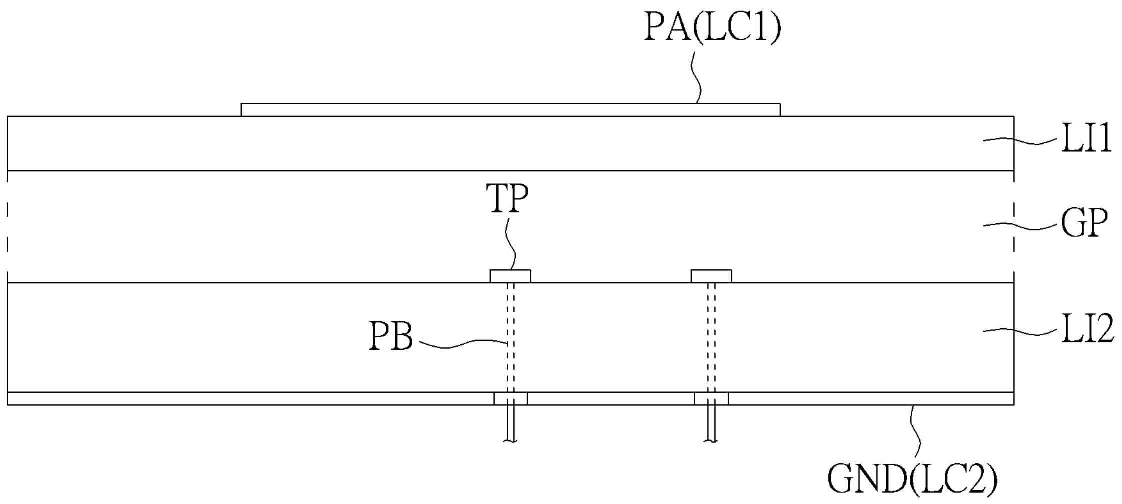
FIG. 25 illustrates a side view of the dual-polarized antenna according to another embodiment.

FIG. 25 illustrates a side view of the dual-polarized antenna AN according to another embodiment. The dual-polarized antenna AN in FIG. 25 may be similar to that in FIG. 20 and FIG. 21. The dual-polarized antenna AN in FIG. 25 may include a conductive top portion TP and a probe PB coupled to one another and used to transmit signal to the patch PA or receive signal from the patch PA using the coupling effect. The dual-polarized antenna AN in FIG. 25 may include a first insulation layer LI1, a second insulation layer LI2 and a gap GP. The first insulation layer LI1 may be located between the first conductive layer LC1 and the second conductive layer LC2. The second insulation layer LI2 may be located between the first insulation layer LC1 and the second conductive layer LC2 and include a first side and a second side where the second conductive layer LC2 is at the second side. The gap GP may be located between the first insulation layer LI1 and the second insulation layer LI2. As FIG. 20, the second conductive layer LC2 may have a hole for the probe PB to pass through to be coupled to the transmission circuit 110 or the reception circuit 120.

In the text, each of the mentioned insulation layers may be a substrate or a layer made of an insulation material. For example, when the insulation material is air, the insulation layer may be a gap. In the text, each of the mentioned conductive lines may be a microstrip line.

FIG. 2 to FIG. 25 introduce a plurality of sorts of conductive paths used in a dual-polarized antenna AN for accessing signals with the transmission circuit 110 and/or the reception circuit 120. As mentioned above, a conductive line coupled to a patch, a probe, a probe with a conductive part, and/or a conductive line insulated from a patch can be used to accessed the transmission signal ST1 and/or the reception signal SR1 shown in FIG. 1.

The abovementioned structures may be used in hybrid. Each of FIG. 26 to FIG. 30 illustrates a top view of the dual-polarized antenna AN with a hybrid structure according to another embodiment.

Figure 26:
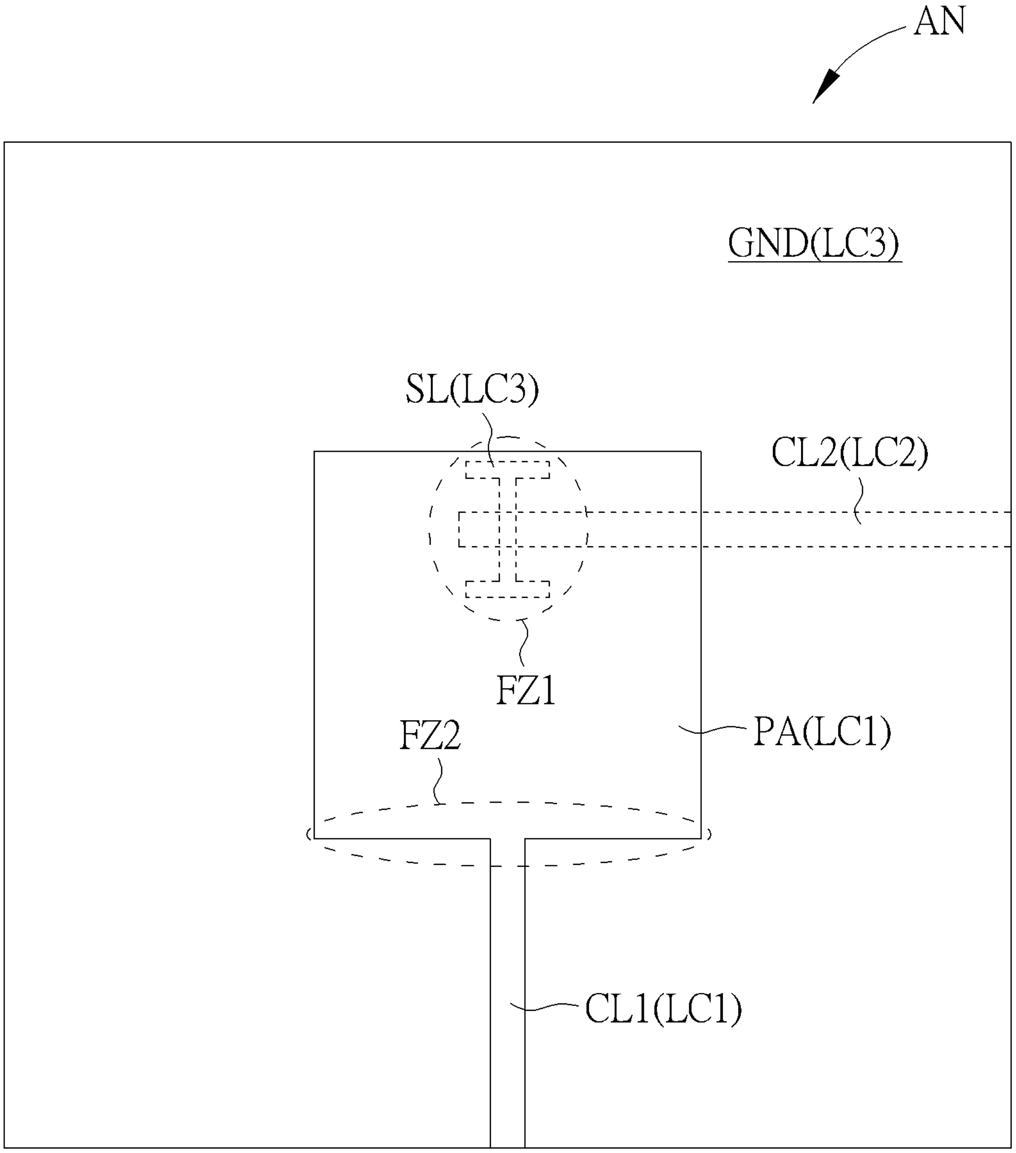
FIG. 26 to FIG. 30 illustrate top views of the dual-polarized antennas with hybrid structures according to other embodiments.

The dual-polarized antenna AN in FIG. 26 may include a first conductive layer LC1, a third conductive layer LC3 and a second conductive layer LC2 from top to bottom as FIG. 7. A ground GND may be formed on the second conductive layer LC2. A first conductive line CL1 may be coupled to the patch PA and formed on the first conductive layer LC1. A slot SL may be formed on the third conductive layer LC3. For example, the slot SL may have an H shape, but embodiments are not limited thereto. A second conductive line CL2 may be formed on the second conductive layer LC2 and access signals to and from the patch PA through the slot SL using the coupling effect. In other words, in FIG. 26, the first conductive line CL1 may be similar to the conductive line CL shown in FIG. 2, and the second conductive line CL2 may be similar to the conductive line CL shown in FIG. 6.

Figure 27:
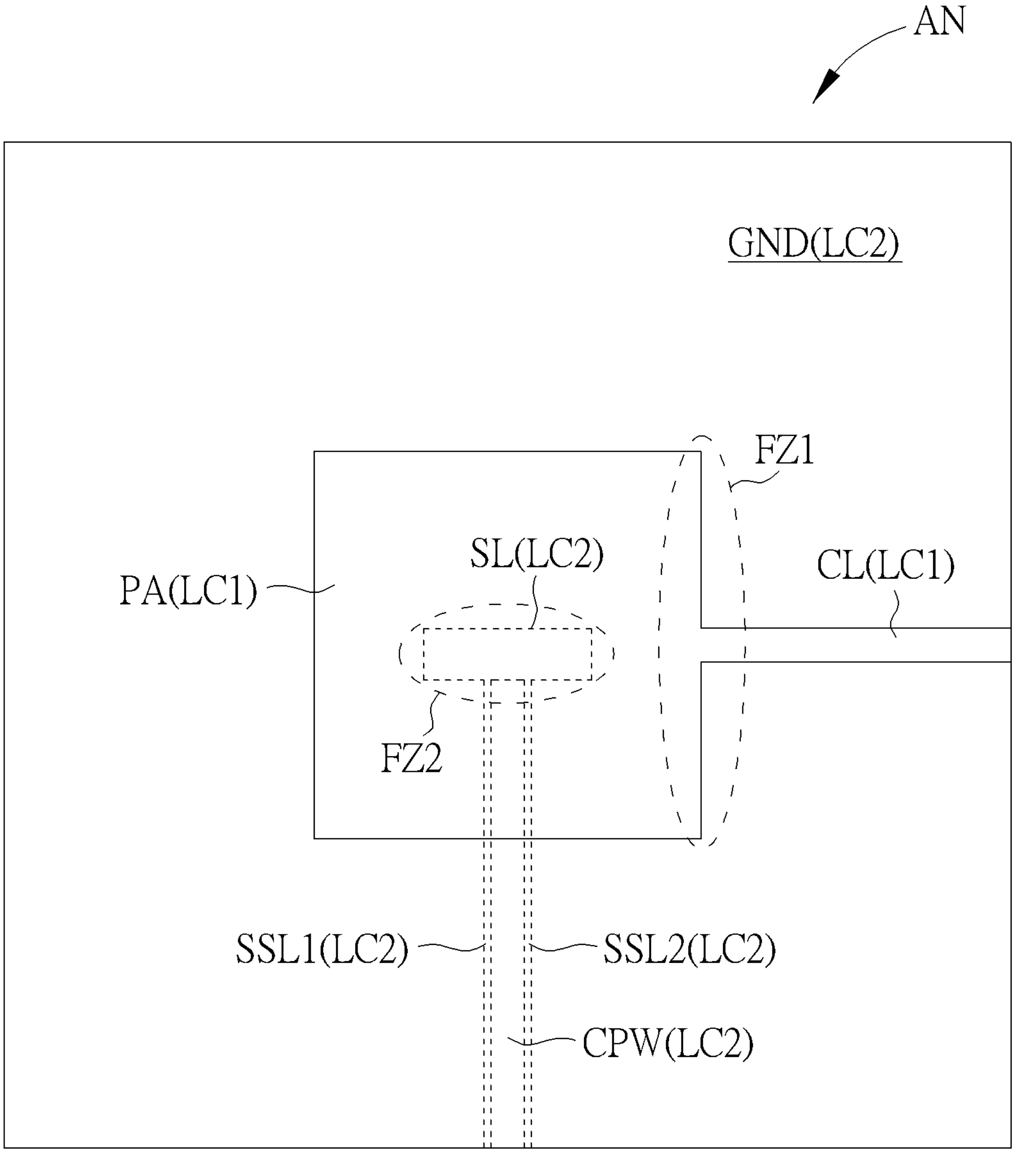

The dual-polarized antenna AN in FIG. 27 may include a conductive line CL and a coplanar waveguide CPW. The conductive line CL and the coplanar waveguide CPW may be two conductive paths coupled to one and the other one of the transmission circuit 110 and the reception circuit 120. The dual-polarized antenna AN in FIG. 27 may include a first conductive layer LC1 and a second conductive layer LC2. A patch PA may be formed on a first conductive layer LC1. A ground GND may be formed on a second conductive layer LC2. An insulation layer may be located between the first conductive layer LC1 and the second conductive layer LC2. A slot SL may be generated on the second conductive layer LC2 and located to overlap one of the first feed zone FZ1 and the second feed zone FZ2.

In the example of FIG. 27, the slot SL overlaps the second feed zone FZ2. Two straight slots SSL1 and SSL2 may be generated on the second conductive layer LC2 and inwardly extended from an edge or an inner portion of the ground GND to the slot SL. The first conductive layer LC1 may or may not be insulated from the second conductive layer LC2 according to embodiments. The two straight slots SSL1 and SSL2 may be parallel or angular with one another, and a portion between the two straight slots SSL1 and SSL2 is used as the coplanar waveguide CPW for accessing the transmission signal ST1 or the reception signal SR1 accordingly. FIG. 27 merely shows an example. The straight slots SSL1 and SSL2 may be extended to locations for being coupled to pins of a chip. The straight slots SSL1 and SSL2 may be designed in a taper style. The straight slots SSL1 and SSL2 may be designed to be in parallel with another coplanar waveguide with regarding resistance conversion.

Figure 28:
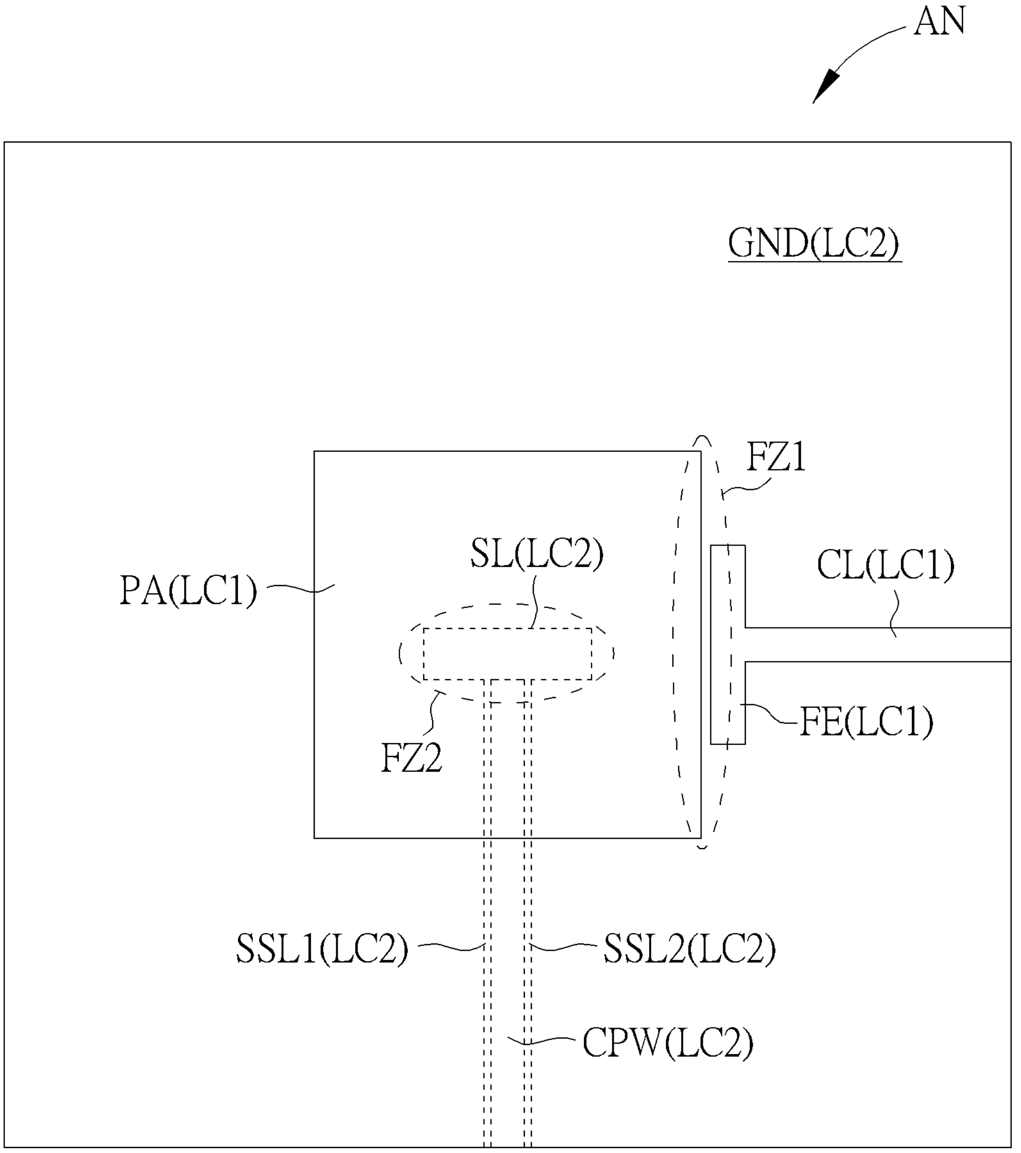

The dual-polarized antenna AN in FIG. 28 may include a feed element FE and a coplanar waveguide CPW. The dual-polarized antenna AN in FIG. 28 may include a first conductive layer LC1 and a second conductive layer LC2 as described in FIG. 2, FIG. 3 and FIG. 28. The patch PA and the coplanar waveguide CPW may be similar to that shown in FIG. 27, and it is not repeatedly described. The feed element FE may be formed on the first conductive layer LC1 and be insulated from the patch PA. The feed element FE may be located corresponding to one of the first feed zone FZ1 and the second feed zone FZ2. In the example of FIG. 28, the feed element FE is located corresponding to the first feed zone FZ1. Signals may be transceived between the feed element FE and the patch PA by means of the coupling effect. The conductive line CL may be formed on the first conductive layer LC1 and coupled to the feed element FE for accessing the transmission signal ST1 or the reception signal SR1 accordingly. The feed element FE and the coplanar waveguide CPW may be coupled to one and the other one of the transmission circuit 110 and the reception circuit 120.

Figure 29:
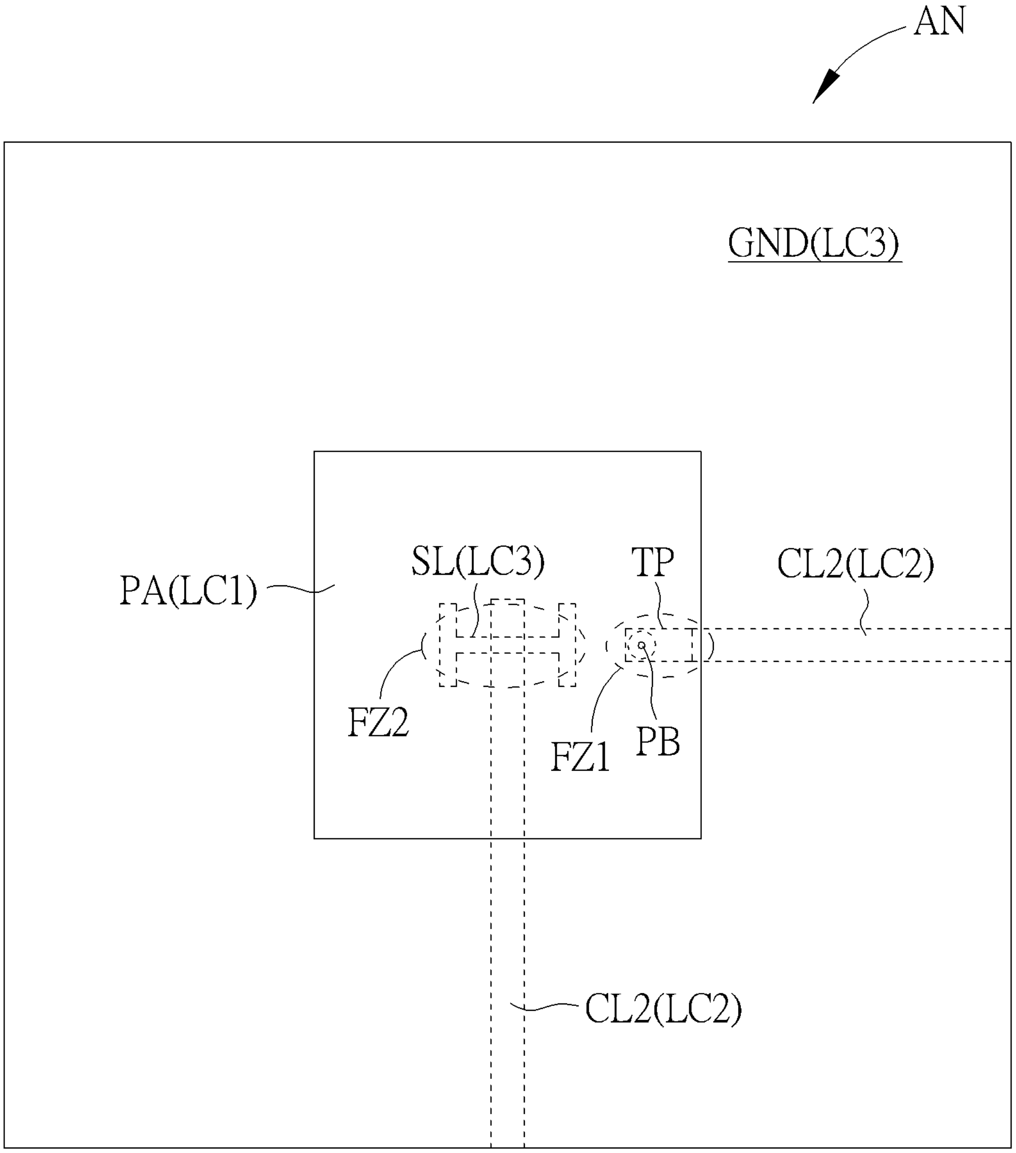

The dual-polarized antenna AN in FIG. 29 may include a first conductive layer LC1, a third conductive layer LC3 and a second conductive layer LC2 from top to bottom as FIG. 6. In FIG. 29, a first conductive line CL1 may be formed on the second conductive layer LC2. A top conductive portion TP may overlap one of the first feed zone F1 and the second feed zone F2 and be located between the first conductive layer LC1 and the third conductive layer LC3. A probe PB may have a first terminal coupled to the top conductive portion TP and a second terminal coupled to the first conductive line CL1. The probe PB may pass through a hole formed on the third conductive layer LC3. In other words, the path formed with the top conductive portion TP, the probe PB and the first conductive line CL1 may be similar to the example of FIG. 20 and FIG. 21. The second conductive line CL2 may be similar to the conductive line CL shown in FIG. 6 and FIG. 7.

Figure 30:
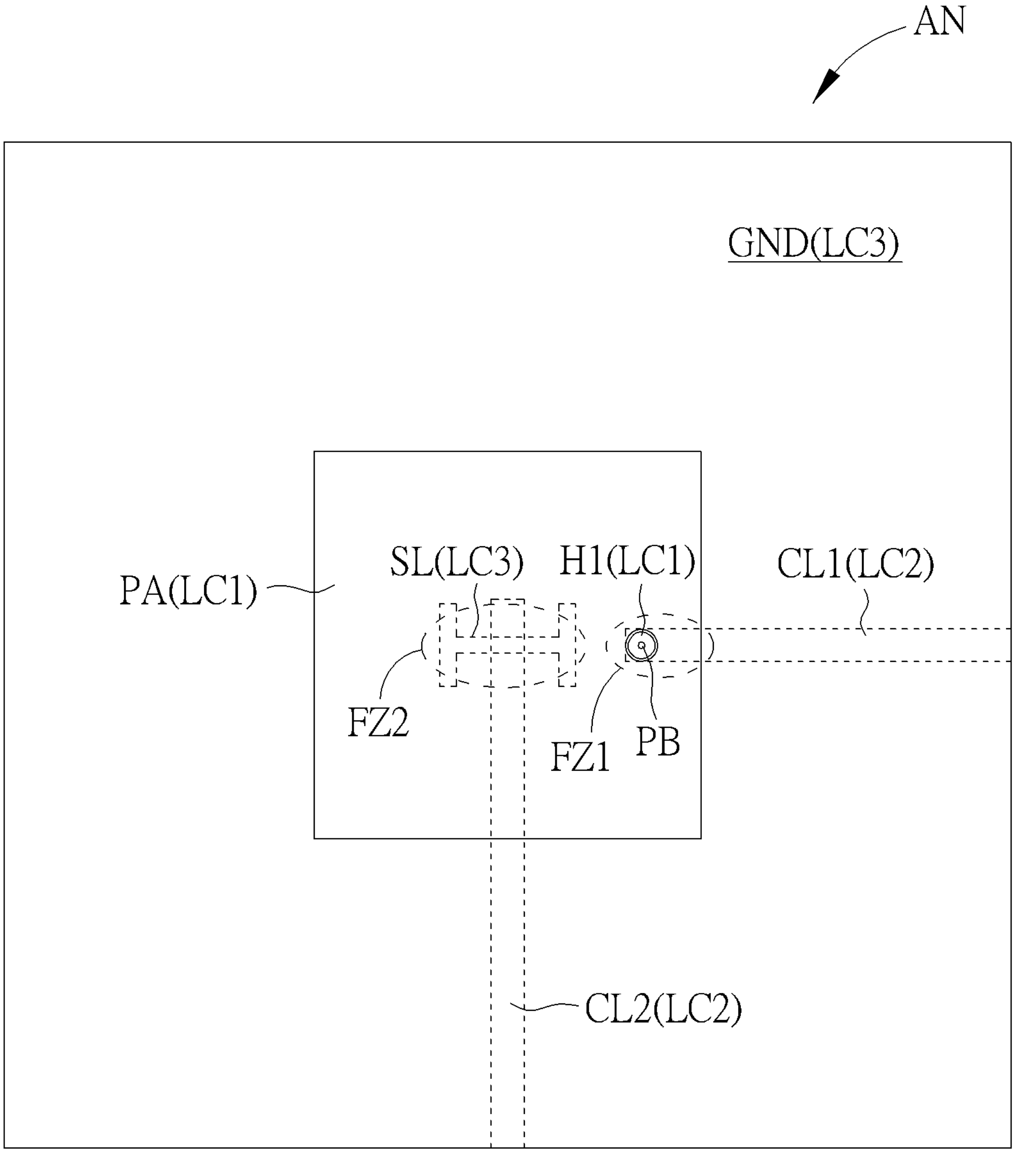

The dual-polarized antenna AN in FIG. 30 may include a first conductive layer LC1, a third conductive layer LC3 and a second conductive layer LC2 from top to bottom as FIG. 6. In FIG. 30, the dual-polarized antenna AN may include a first conductive line CL1 and a second conductive line CL2. The first conductive line CL1 may be formed on the second conductive layer LC2 and coupled to a probe PB. The probe PB may pass through the third conductive layer LC3 via a hole on the third conductive layer LC3. A hole H1 may also be formed on the first conductive layer LC1 so that the probe PB may be insulated from the first conductive layer LC1 and the third conductive layer LC3. The conductive line CL2 in FIG. 30 may be similar to conductive line CL2 in FIG. 29 and not repeatedly described.

The dual-polarized antenna AN in each of FIG. 26 to FIG. 30 may be deemed to have a hybrid structure because of having two sorts of conductive paths corresponding to the two feed zones FZ1 and FZ2.

The dual-polarized antennas AN in FIG. 26 to FIG. 30 are merely examples instead of limiting embodiments. If the structure is manufacturable, two or more sorts of abovementioned conductive paths may be used in a dual-polarized antennas AN to form a hybrid structure for accessing the transmission signal ST1 and/or the reception signal SR1.

The locations of the first feed zone FZ1 and the second feed zone FZ2 shown in FIG. 1 to FIG. 30 are mere examples. According to embodiments, the dual-polarized antenna AN may include a patch PA, and each of the first feed zone FZ1 and the second feed zone FZ2 may be located near a side of the patch PA, a center of the patch PA or a corner of the patch PA. The locations of the feed zones FZ1 and FZ2 may be adjusted to improve the performance of the antenna matching. The effect of signal feeding may be insufficient initially; however, some skills (such as adjusting BOM (bill of material) or using open/short stub) may be used to improve the matching related to the feed zones FZ1 and FZ2 and improve the effect of signal feeding.

Figure 31:
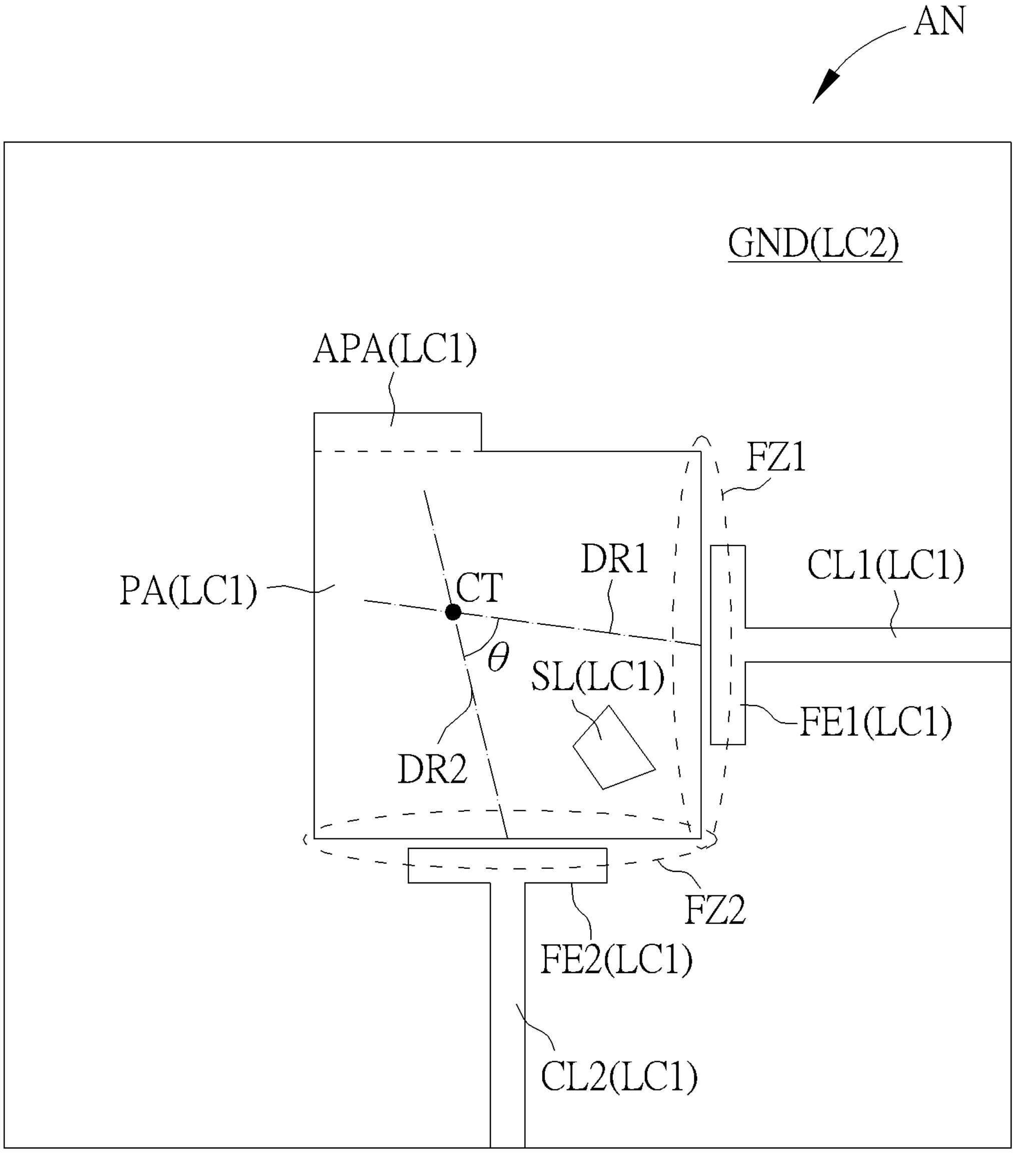
FIG. 31 illustrates a top view of the dual-polarized antenna according to another embodiment.

FIG. 31 illustrates a top view of the dual-polarized antenna AN according to another embodiment. As shown in FIG. 31, the dual-polarized antenna AN may include a patch PA, a first conductive line CL1, a second conductive line CL2, a first feed element FE1, a second feed element FE2, a ground GND, an insulation layer LI (not shown). The patch PA, the first conductive line CL1, the second conductive line CL2, the first feed element FE1, and the second feed element FE2 may be formed on a first conductive layer LC1. The ground GND may be formed on a second conductive layer LC2. The first feed element FE1 is located corresponding to the first feed zone FZ1, and the second feed element FE2 is located corresponding to the second feed zone FZ2. In other words, in FIG. 31, the first conductive line CL1 and the second conductive line CL2 may be similar to the conductive line CL shown in FIG. 28. Signals may be transceived between the first/second element FE1/FE2 and the patch PA by means of the coupling effect. The first/second conductive line CL1/CL2 may be formed on the first conductive layer LC1 and coupled to the first/second feed element FE1/FE2 for accessing the transmission signal ST1 or the reception signal SR1 accordingly. The insulation layer LI may be located between the first conductive layer LC1 and the second conductive layer LC2. The first conductive layer LC1 may or may not be insulated from the second conductive layer LC2 according to embodiments. The first/second conductive line CL1/CL2 may be a microstrip line. Each insulation layer mentioned in the text may be a substrate. The patch PA may include an additional shape APA and/or a slot/aperture SL. A line DR1 can be from the shape centroid of the first feed zone FZ1 to the shape centroid CT of the patch PA, a line DR2 can be from the shape centroid of the second feed zone FZ2 to the shape centroid CT of the patch PA, and an angle θ is formed by the lines DR1 and DR2. Besides, the structure of the dual-polarized antenna AN may be replaced by the abovementioned dual-polarized antenna AN as shown in FIG. 1 to FIG. 30.

In some situations of the wireless signal transceiver device 100, the frequency corresponding to the best performance of return loss of the first wireless signal STX, the frequency corresponding to the best performance of return loss of the second wireless signal SRX, and the frequency corresponding to the best performance of the isolation between the first wireless signal STX and the second wireless signal SRX may be different. For example, the trace length corresponding to the transmission circuit 110 and the trace length corresponding to the reception circuit 120 may be different because of the PCB design of the wireless signal transceiver device 100. Hence, as shown in FIG. 31, the shape of the patch PA may be generated by adding the additional shape APA (e.g. a small rectangle) to an original shape (e.g. a larger square), and/or by removing a slot/aperture SL (e.g., a smaller trapezoid) from the original shape (e.g. a larger square), so that the angle θ is not equal to 90 degrees. For example, 45 degrees<θ<90 degrees, or 90 degrees<θ<135 degrees.

Figure 32:
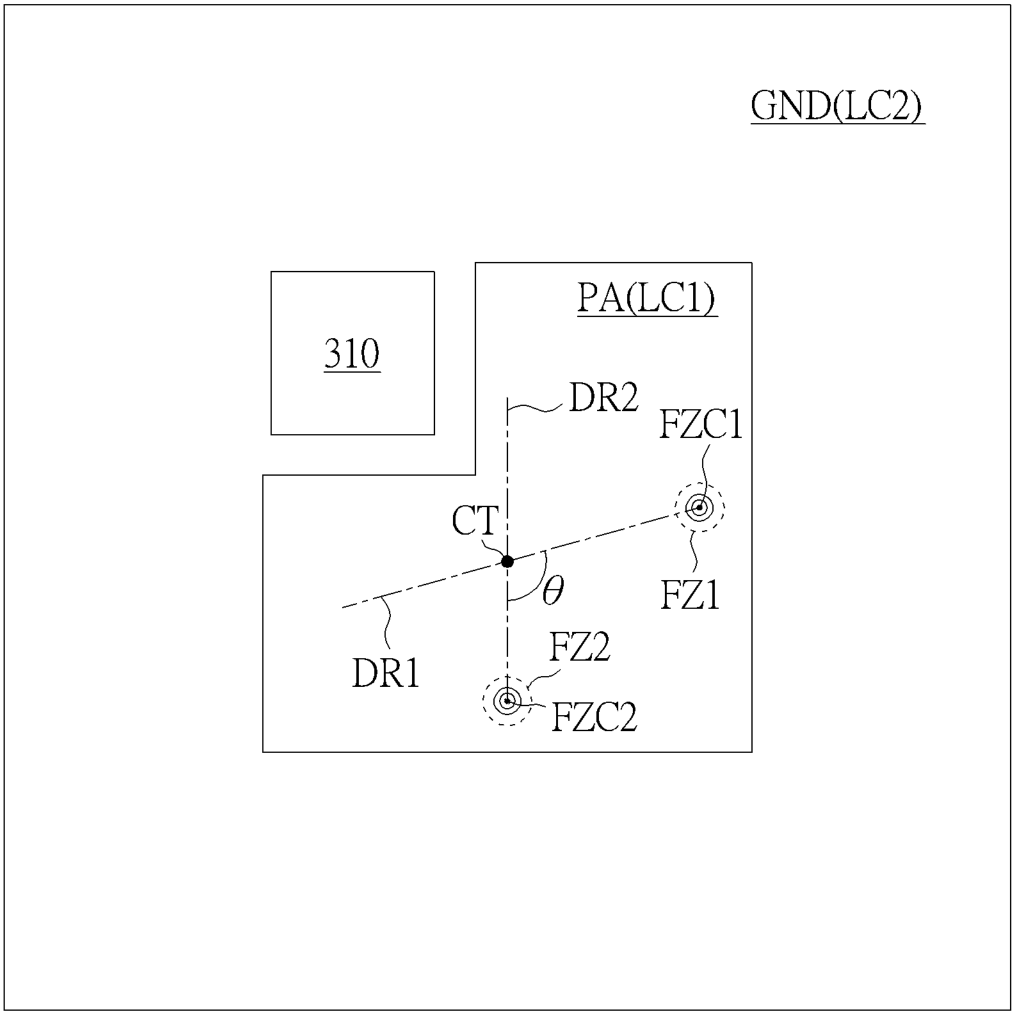
FIG. 32 illustrates a top view of a dual-polarized antenna and a circuit according to an embodiment.

FIG. 32 illustrates a top view of a dual-polarized antenna AN and a circuit 310 according to an embodiment. In a compact device, some circuit component(s) may occupy an area, where the area may be occupied by the patch or another part of an antenna in other cases. Hence, as shown in FIG. 32, the shape of the dual-polarized antenna AN or the shape of the patch PA of the dual-polarized antenna AN may be an non-convex shape (e.g. a concave shape). For example, as shown in FIG. 32, the patch may have a concave hexagonal shape, where the concave hexagonal shape may be generated by removing a part (e.g., a smaller square) from an original shape (e.g. a larger square). FIG. 32 merely provides an example. Likewise, a part of a circular patch, a triangular patch or a rectangular patch may be removed for placing a circuit. The dual-polarized antenna AN in FIG. 32 may be similar to the dual-polarized antenna AN in FIG. 14 to have probes; however, this is merely an example In FIG. 32, the line DR1 can be from the shape centroid FZC1 of a feed zone to the shape centroid CT of the dual-polarized antenna AN. The line DR2 can be from the shape centroid FZC2 of another feed zone to the shape centroid CT of the dual-polarized antenna AN. Since the shape of the patch PA may not be a complete rectangle, triangle or circle, the lines DR1 and DR2 may not be perpendicular to one another. For example, regarding the angle θ formed by the lines DR1 and DR2, θ≠90 degrees. For example, 45 degrees<θ<90 degrees, or 90 degrees<θ<135 degrees.

In summary, embodiments provide a plurality of solutions for designing conductive paths of a dual-polarized antennas AN to transceive signals with the transmission circuit 110 and the reception circuit 120. The performance and size of the dual-polarized antennas AN can be adjusted more easily, and the flexibility of design can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless signal transceiver device, comprising:

a dual-polarized antenna configured to transmit a first wireless signal and receive a second wireless signal at the same time, wherein the first wireless signal is reflected by an object to generate the second wireless signal, and the dual-polarized antenna comprises:

a first feed zone configured to receive a transmission signal, wherein the first wireless signal is generated according to at least the transmission signal; and a second feed zone configured to output a reception signal generated according to the second wireless signal;

wherein the dual-polarized antenna is configured to form a first radiated electric-field having a first co-polarization according to the first wireless signal and form a second radiated electric-field having a second co-polarization according to the second wireless signal, and the first co-polarization and the second co-polarization form an angle between 45 degrees to 135 degrees to each other in a far field;

a transmission circuit configured to generate the transmission signal according to an input signal;

a reception circuit configured to generate a processing signal according to the reception signal; and a processing unit couple to the transmission circuit and the reception circuit, and configured to generate a spatial information of the object according to the processing signal and the input signal.

2. The wireless signal transceiver device of claim 1, wherein the dual-polarized antenna comprises:

a patch formed on a first conductive layer;

a conductive line formed on the first conductive layer, coupled to one of the first feed zone and the second feed zone, and configured to access the transmission signal or the reception signal accordingly;

a ground formed on a second conductive layer; and an insulation layer located between the first conductive layer and the second conductive layer.

3. The wireless signal transceiver device of claim 1, wherein the dual-polarized antenna comprises:

a patch formed on a first conductive layer;

a ground formed on a second conductive layer;

a conductive line formed on a third conductive layer, disposed to overlap one of the first feed zone and the second feed zone, and configured to access the transmission signal or the reception signal accordingly;

a first insulation layer located between the first conductive layer and the third conductive layer; and a second insulation layer located between the second conductive layer and the third conductive layer;

wherein the third conductive layer is located between the first conductive layer and the second conductive layer.

4. The wireless signal transceiver device of claim 1, wherein the dual-polarized antenna comprises:

a patch formed on a first conductive layer;

a conductive line formed on a second conductive layer, disposed to overlap one of the first feed zone and the second feed zone, and configured to access the transmission signal or the reception signal accordingly;

a ground formed on a third conductive layer;

a slot generated on the third conductive layer and located between the conductive line and the patch;

a first insulation layer located between the first conductive layer and the third conductive layer; and a second insulation layer located between the third conductive layer and the second conductive layer;

wherein the third conductive layer is between the first conductive layer and the second conductive layer.

5. The wireless signal transceiver device of claim 4, wherein:

the slot has a rectangular shape, an H shape, a circular shape, an oval shape or an irregular shape; and each of the first feed zone and the second feed zone is located near a side of the patch, a center of the patch or a corner of the patch.

6. The wireless signal transceiver device of claim 1, wherein the dual-polarized antenna comprises:

a patch formed on a first conductive layer;

a ground formed on a second conductive layer;

a hole generated on the second conductive layer and disposed to overlap one of the first feed zone and the second feed zone;

a probe disposed through the hole, comprising a first terminal coupled to the patch and a second terminal, and configured to access the transmission signal or the reception signal accordingly; and an insulation layer located between the first conductive layer and the second conductive layer.

7. The wireless signal transceiver device of claim 6, further comprising:

a first slot formed on the patch and disposed to cut off a first part of an edge of the patch;

a second slot formed on the patch and disposed to cut off a second part of the edge of the patch;

a third slot formed on the patch and disposed to cut off a third part of the edge of the patch; and a fourth slot formed on the patch and disposed to cut off a fourth part of the edge of the patch;

wherein the first feed zone is located between the first slot and the second slot, the second feed zone is located between the second slot and the third slot, the second slot is opposite to the fourth slot, and the first slot is opposite to the third slot.

8. The wireless signal transceiver device of claim 6, further comprising:

a first slot formed on the patch;

a second slot formed on the patch;

a third slot formed on the patch; and a fourth slot formed on the patch;

wherein the first slot, the second slot, the third slot and the fourth slot are symmetrically disposed around a shape centroid of the patch, each of the first slot, the second slot, the third slot and the fourth slot has a substantially same shape, and the first slot is opposite to the third slot, the second slot is opposite to the fourth slot, the first feed zone is between the first slot and the fourth slot, and the second feed zone is between the first slot and the second slot.

9. The wireless signal transceiver device of claim 8, wherein each of the first slot, the second slot, the third slot and the fourth slot has an L shape so as to have a first part, a second part and a turning point connected to the first part and the second part, and the patch has a rectangular shape with four sides, and the first part of each of the first slot, the second slot, the third slot and the fourth slot is substantially parallel to one of the sides of the patch.

10. The wireless signal transceiver device of claim 6, wherein the patch has a triangular shape, a first line is defined by a shape centroid of the first feed zone and a shape centroid of the patch, a second line is defined by a shape centroid of the second feed zone and the shape centroid of the patch, and the first line and the second line forms an angle between 45 degrees to 135 degrees.

11. The wireless signal transceiver device of claim 6, further comprising:

a first slot generated on the ground;

a second slot generated on the ground;

a third slot generated on the ground; and a fourth slot generated on the ground;

wherein a shape centroid of the first feed zone overlaps an area between two adjacent slots of the first slot to the fourth slot, and a shape centroid of the second feed zone overlaps an area between another two adjacent slots of the first slot to the fourth slot.

12. The wireless signal transceiver device of claim 1, wherein the dual-polarized antenna comprises:

a patch formed on a first conductive layer and comprising a first hole;

a ground formed on a second conductive layer and comprising a second hole;

an insulation layer located between the first conductive layer and the second conductive layer;

a conductive top portion formed on the first conductive layer and located in the first hole; and a probe located through the second hole, comprising a first terminal coupled to the conductive top portion and a second terminal, and configured to access the transmission signal or the reception signal accordingly;

wherein the first hole and the second hole overlap one of the first feed zone and the second feed zone, the probe and the conductive top portion is insulated from each of the first conductive layer and the second conductive layer.

13. The wireless signal transceiver device of claim 1, wherein the dual-polarized antenna comprises:

a patch formed on a first conductive layer and comprising a first hole;

a ground formed on a second conductive layer and comprising a second hole;

an insulation layer located between the first conductive layer and the second conductive layer; and a probe located through the second hole, comprising a first terminal and a second terminal, and configured to access the transmission signal or the reception signal accordingly;

wherein the first terminal of the probe is in the first hole, the first hole and the second hole overlap one of the first feed zone and the second feed zone, the probe is insulated from each of the first conductive layer and the second conductive layer.

14. The wireless signal transceiver device of claim 1, wherein the dual-polarized antenna comprises:

a patch formed on a first conductive layer and comprising a first hole;

a ground formed on a second conductive layer and comprising a second hole;

an insulation layer located between the first conductive layer and the second conductive layer;

a conductive top portion located above the first hole; and a probe located through the first hole and the second hole, comprising a first terminal coupled to the conductive top portion and a second terminal, and configured to access the transmission signal or the reception signal accordingly;

wherein the first hole and the second hole overlap one of the first feed zone and the second feed zone, the probe and the conductive top portion is insulated from each of the first conductive layer and the second conductive layer.

15. The wireless signal transceiver device of claim 1, wherein the dual-polarized antenna comprises:

a patch formed on a first conductive layer;

a ground formed on a second conductive layer and comprising a hole;

an insulation layer located between the first conductive layer and the second conductive layer;

a conductive top portion located between the first conductive layer and the second conductive layer;

a probe located through the hole, comprising a first terminal coupled to the conductive top portion and a second terminal, and configured to access the transmission signal or the reception signal accordingly;

wherein the hole overlaps one of the first feed zone and the second feed zone, and the probe and the conductive top portion is insulated from each of the first conductive layer and the second conductive layer.

16. The wireless signal transceiver device of claim 1, wherein the dual-polarized antenna comprises:

a patch formed on a first conductive layer;

a ground formed on a second conductive layer and comprising a hole;

a first insulation layer located between the first conductive layer and the second conductive layer;

a second insulation layer located between the first insulation layer and the second conductive layer and comprising a first side and a second side wherein the second conductive layer is at the second side;

a gap located between the first insulation layer and the second insulation layer;

a conductive top portion located at the first side of the second insulation layer; and a probe disposed through the second insulation layer, comprising a first terminal coupled to the conductive top portion and a second terminal, and configured to access the transmission signal or the reception signal accordingly;

wherein the conductive top portion overlaps one of the first feed zone and the second feed zone, and the probe and the conductive top portion is insulated from each of the first conductive layer and the second conductive layer.

17. The wireless signal transceiver device of claim 1, wherein the dual-polarized antenna comprises:

a patch formed on a first conductive layer;

a ground formed on a second conductive layer;

an insulation layer located between the first conductive layer and the second conductive layer;

a slot generated on the second conductive layer and located to overlap one of the first feed zone and the second feed zone; and two straight slots generated on the second conductive layer and inwardly extended from an edge or an inner portion of the ground to the slot;

wherein the two straight slots are parallel or angular with one another, and a portion between the two straight slots is used as a coplanar waveguide for accessing the transmission signal or the reception signal accordingly.

18. The wireless signal transceiver device of claim 1, wherein the dual-polarized antenna comprises:

a patch formed on a first conductive layer;

a ground formed on a second conductive layer;

an insulation layer located between the first conductive layer and the second conductive layer;

a feed element formed on the first conductive layer and located corresponding to one of the first feed zone and the second feed zone; and a conductive line formed on the first conductive layer, coupled to the feed element, and configured to access the transmission signal or the reception signal accordingly;

wherein the feed element is insulated from the patch.

19. The wireless signal transceiver device of claim 1, wherein the dual-polarized antenna comprises a patch, and each of the first feed zone and the second feed zone is located near a side of the patch, a center of the patch or a corner of the patch.

20. The wireless signal transceiver device of claim 1, wherein a first line is defined from a shape centroid of the first feed zone to a shape centroid of the dual-polarized antenna, a second line is defined from a shape centroid of the second feed zone to the shape centroid of the dual-polarized antenna, and the first line and the second line form an angle between 45 to 135 degrees.

* * * * *